United States Patent
Kalamkar et al.

(10) Patent No.: US 12,375,991 B2
(45) Date of Patent: Jul. 29, 2025

(54) HANDOVER INDICATION FOR DATA STREAM

(71) Applicant: QUALCOMM Incorporated, San Diego, CA (US)

(72) Inventors: Sanket Sanjay Kalamkar, San Diego, CA (US); Ravi Agarwal, San Diego, CA (US); Peerapol Tinnakornsrisuphap, San Diego, CA (US); Hyun Yong Lee, San Diego, CA (US); Mickael Mondet, Louannec (FR); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/804,993

(22) Filed: Jun. 1, 2022

(65) Prior Publication Data
US 2023/0319663 A1    Oct. 5, 2023

Related U.S. Application Data

(60) Provisional application No. 63/269,080, filed on Mar. 9, 2022.

(51) Int. Cl.
*H04W 36/18* (2009.01)
*H04W 36/00* (2009.01)
*H04W 36/08* (2009.01)

(52) U.S. Cl.
CPC ....... *H04W 36/18* (2013.01); *H04W 36/0058* (2018.08); *H04W 36/0061* (2013.01); *H04W 36/08* (2013.01)

(58) Field of Classification Search
CPC ......... H04W 36/0058; H04W 36/0061; H04W 36/08; H04W 36/18
See application file for complete search history.

(56) References Cited

U.S. PATENT DOCUMENTS

2007/0254664 A1* 11/2007 Klotsche ............... H04W 36/02
                                                            455/436
2013/0170471 A1*  7/2013 Nix ........................ H04L 65/61
                                                            370/331
(Continued)

FOREIGN PATENT DOCUMENTS

EP          2323438 A2 *  5/2011  ....... H04N 21/41407
KR      100803862 B1 *  2/2008  ............ H04W 36/14
WO   WO-2016164611 A1    10/2016

OTHER PUBLICATIONS

International Search Report and Written Opinion—PCT/US2023/060023—ISA/EPO—Mar. 21, 2023.

*Primary Examiner* — Brian P Cox
(74) *Attorney, Agent, or Firm* — Harrity & Harrity, LLP

(57) ABSTRACT

Various aspects of the present disclosure generally relate to wireless communication. In some aspects, an application server may receive an indication that a handover is likely for a user equipment (UE), wherein the UE is in communication with the application server to receive a data stream. The application server may provide the data stream using values of one or more parameters to reduce an impact of a communication interruption associated with the handover. Numerous other aspects are described.

30 Claims, 16 Drawing Sheets

(56) References Cited

U.S. PATENT DOCUMENTS

2014/0156728 A1\* 6/2014 Gangadharan ...... H04L 65/1063
709/203
2016/0344642 A1\* 11/2016 Brisebois ................ H04L 47/30
2024/0334272 A1\* 10/2024 Sachs ................ H04W 36/0016

\* cited by examiner

HANDOVER INDICATION FOR DATA STREAM

CROSS-REFERENCE TO RELATED APPLICATION

This Patent Application claims priority to U.S. Provisional Patent Application No. 63/269,080, filed on Mar. 9, 2022, entitled "HANDOVER INDICATION FOR DATA STREAM APPLICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for handover indications for data stream application.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include detecting that a handover is likely for the UE, wherein the UE is in communication with an application server to transmit a data stream. The method may include transmitting the data stream having values of one or more parameters applied to reduce an impact of a communication interruption associated with the handover.

Some aspects described herein relate to a UE for wireless communication. The UE may include a memory and one or more processors coupled to the memory. The one or more processors may be configured to detect that a handover is likely for the UE, wherein the UE is in communication with an application server to transmit a data stream. The one or more processors may be configured to transmit the data stream having values of one or more parameters applied to reduce an impact of a communication interruption associated with the handover.

Some aspects described herein relate to a non-transitory computer-readable medium that stores a set of instructions for wireless communication by a UE. The set of instructions, when executed by one or more processors of the UE, may cause the UE to detect that a handover is likely for the UE, wherein the UE is in communication with an application server to transmit a data stream. The set of instructions, when executed by one or more processors of the UE, may cause the UE to transmit the data stream having values of one or more parameters applied to reduce an impact of a communication interruption associated with the handover.

Some aspects described herein relate to an apparatus for wireless communication. The apparatus may include means for detecting that a handover is likely for the UE, wherein the UE is in communication with an application server to transmit a data stream. The apparatus may include means for transmitting the data stream having values of one or more parameters applied to reduce an impact of a communication interruption associated with the handover.

Some aspects described herein relate to a method of wireless communication performed by an application server. The method may include receiving an indication that a handover is likely for a UE, wherein the UE is in communication with the application server to receive a data stream. The method may include providing the data stream using values of one or more parameters to reduce an impact of a communication interruption associated with the handover.

Some aspects described herein relate to a method of wireless communication performed by a UE. The method may include transmitting, to an application server, an indication that a handover is likely for the UE, wherein the UE is in communication with the application server to receive a data stream. The method may include receiving the data stream having values of one or more parameters applied to reduce an impact of a communication interruption associated with the handover.

Some aspects described herein relate to an application server for wireless communication. The application server may include a memory and one or more processors coupled to the memory. The one or more processors may be configured to receive an indication that a handover is likely for a UE, wherein the UE is in communication with the application server to receive a data stream. The one or more processors may be configured to provide the data stream using values of one or more parameters to reduce an impact of a communication interruption associated with the handover.

Some aspects described herein relate to a UE for wireless communication. The user equipment may include a memory and one or more processors coupled to the memory. The one or more processors may be configured to transmit, to an application server, an indication that a handover is likely for the UE, wherein the UE is in communication with the application server to receive a data stream. The one or more processors may be configured to receive the data stream having values of one or more parameters applied to reduce an impact of a communication interruption associated with the handover.

Some aspects described herein relate to a non-transitory computer-readable medium that stores a set of instructions for wireless communication by an application server. The set of instructions, when executed by one or more processors of the application server, may cause the application server to receive an indication that a handover is likely for a UE, wherein the UE is in communication with the application server to receive a data stream. The set of instructions, when executed by one or more processors of the application server, may cause the application server to provide the data stream using values of one or more parameters to reduce an impact of a communication interruption associated with the handover.

Some aspects described herein relate to a non-transitory computer-readable medium that stores a set of instructions for wireless communication by a UE. The set of instructions, when executed by one or more processors of the UE, may cause the UE to transmit, to an application server, an indication that a handover is likely for the UE, wherein the UE is in communication with the application server to receive a data stream. The set of instructions, when executed by one or more processors of the UE, may cause the UE to receive the data stream having values of one or more parameters applied to reduce an impact of a communication interruption associated with the handover.

Some aspects described herein relate to an apparatus for wireless communication. The apparatus may include means for receiving an indication that a handover is likely for a UE, wherein the UE is in communication with the application server to receive a data stream. The apparatus may include means for providing the data stream using values of one or more parameters to reduce an impact of a communication interruption associated with the handover.

Some aspects described herein relate to an apparatus for wireless communication. The apparatus may include means for transmitting, to an application server, an indication that a handover is likely for the UE, wherein the UE is in communication with the application server to receive a data stream. The apparatus may include means for receiving the data stream having values of one or more parameters applied to reduce an impact of a communication interruption associated with the handover.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
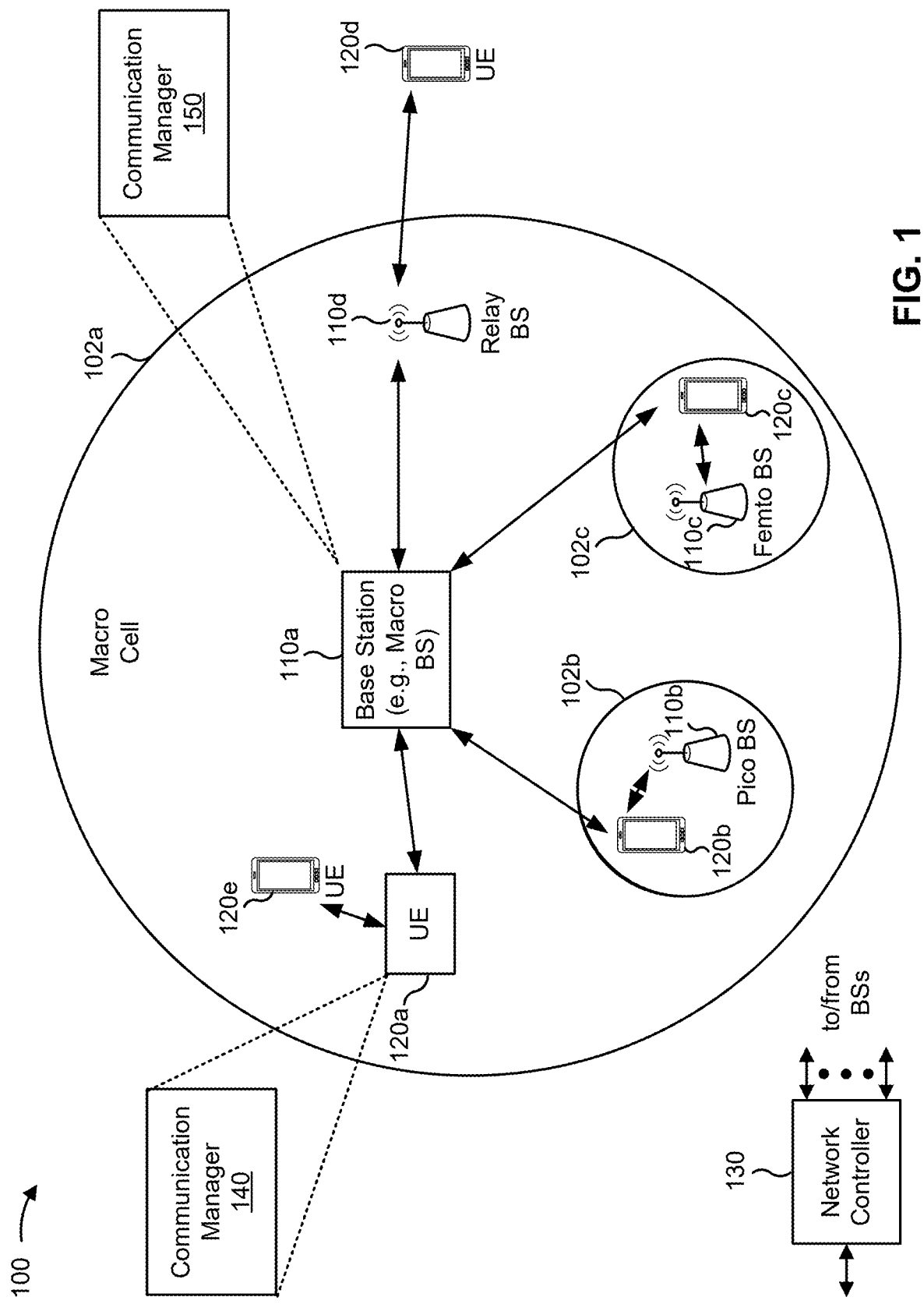
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the application server may include, or may be associated with, a communication manager 150 shown in context of a base station in FIG. 1. For example, the application server may include a first communication manager 150 to manage communications (e.g., application layer and/or user plane communications) with the UE 120 via the base station of FIG. 1 (e.g., using one or more additional network nodes that provide a connection between the application server and the base station). The base station may include a second communication manager 150 that manages communications (e.g., RF communications) transmitted to, and received from, the UE 120. The application server may be remote from the base station (e.g., using hardware at a different geographical location from the base station) or may be co-located with the base station (e.g., using hardware at a same geographical location as the base station).

As described in more detail elsewhere herein, the communication manager 150 may receive an indication that a handover is likely for a UE, wherein the UE is in communication with the application server to receive a data stream (e.g., extended reality (XR) data and/or a real-time video communication); and provide the data stream using values of one or more parameters to reduce an impact of a communication interruption associated with the handover. Additionally, or alternatively, the communication manager 150 may perform one or more other operations described herein.

In some aspects, the UE 120 may include a communication manager 140. As described in more detail elsewhere herein, the communication manager 140 may transmit, to an application server, an indication that a handover is likely for the UE, wherein the UE is in communication with the application server to receive a data stream; and receive the data stream having values of one or more parameters applied to reduce an impact of a communication interruption associated with the handover. Additionally, or alternatively, the communication manager 150 may detect that a handover is likely for the UE, wherein the UE is in communication with an application server to transmit a data stream; and transmit the data stream having values of one or more parameters applied to reduce an impact of a communication interruption associated with the handover. Additionally, or alternatively, the communication manager 140 may perform one or more other operations described herein.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

As indicated above, FIG. 1 is provided as an example. Other examples may differ from what is described with regard to FIG. 1.

Figure 2:
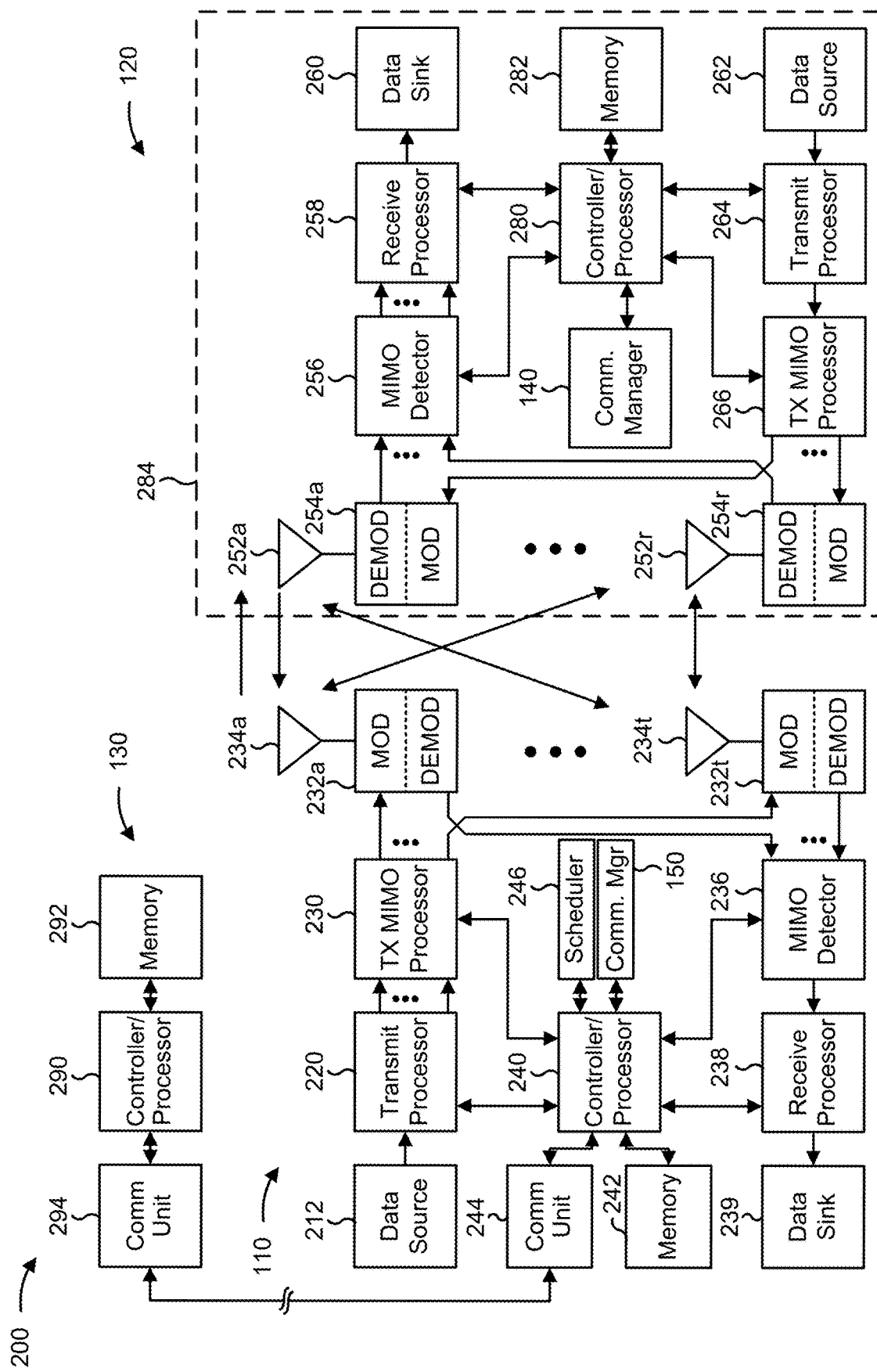
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM, and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-16).

Figure 10:
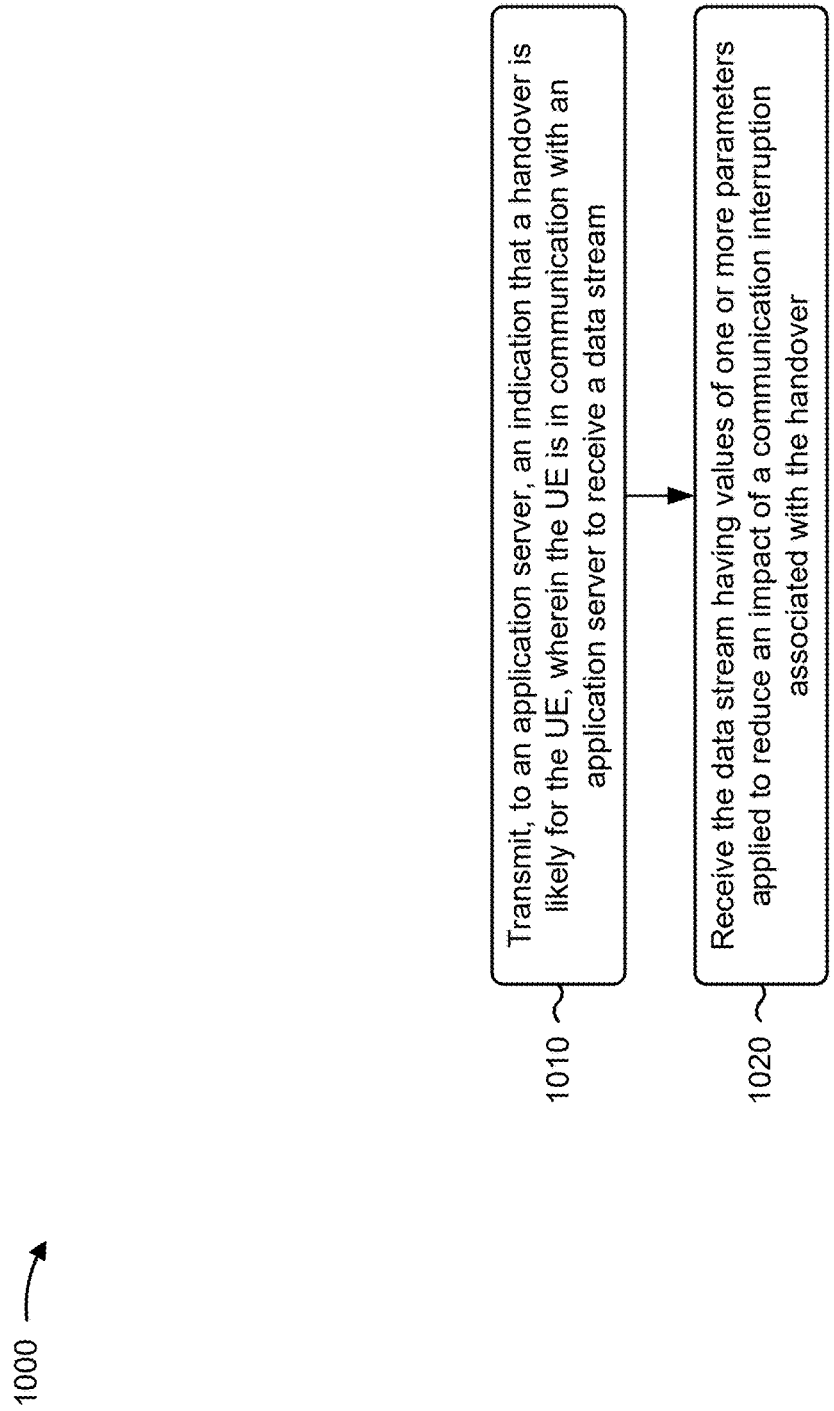
Figure 11:
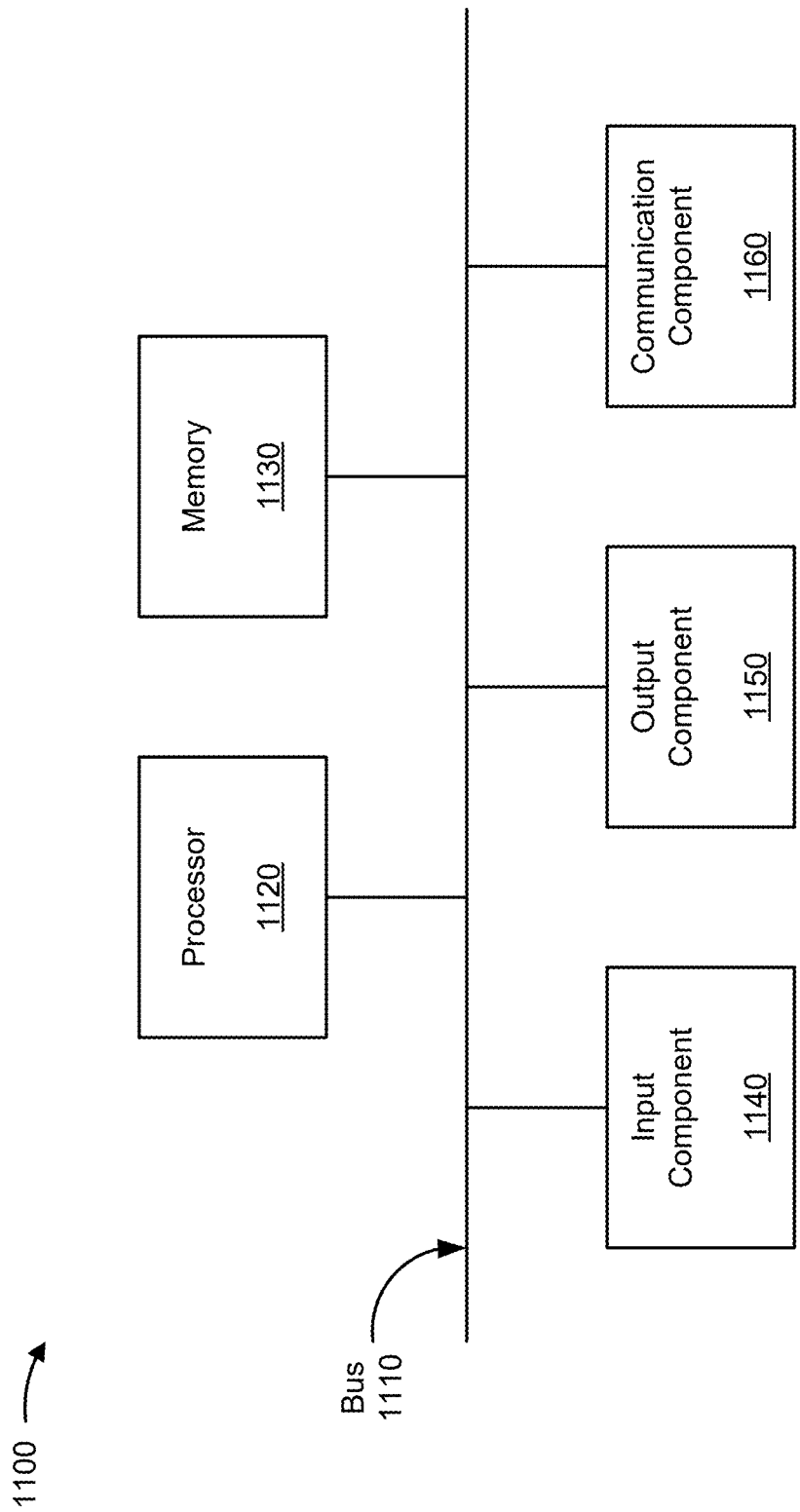
FIGS. 11-12 are diagrams of example apparatuses for wireless communication, in accordance with the present disclosure.

The processor 1120 (of FIG. 11) of an application server associated with the base station 110 (e.g., connected to the UE 120 via a network node, such as base station 110), the controller/processor 280 of the UE 120, and/or any other component(s) of FIG. 2 or FIG. 11 may perform one or more techniques associated with handover indications for data stream application, as described in more detail elsewhere herein. For example, the processor 1120 of the application server, the controller/processor 280 of the UE 120, and/or any other component(s) of FIG. 2 or FIG. 11 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the application server includes means for receiving an indication that a handover is likely for a UE, wherein the UE is in communication with the application server to receive a data stream; and/or means for providing the data stream using values of one or more parameters to reduce an impact of a communication interruption associated with the handover. In some aspects, the means for the application server to perform operations described herein may include, for example, one or more of processor 1120, memory 1130, input component 1140, output component 1150, or communication component 1160.

In some aspects, the UE includes means for transmitting, to an application server, an indication that a handover is likely for the UE, wherein the UE is in communication with the application server to receive a data stream; and/or means for receiving the data stream having values of one or more parameters applied to reduce an impact of a communication interruption associated with the handover. In some aspects, the UE includes means for detecting that a handover is likely for the UE, wherein the UE is in communication with an application server to transmit a data stream; and/or means for transmitting the data stream having values of one or more parameters applied to reduce an impact of a communication interruption associated with the handover. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
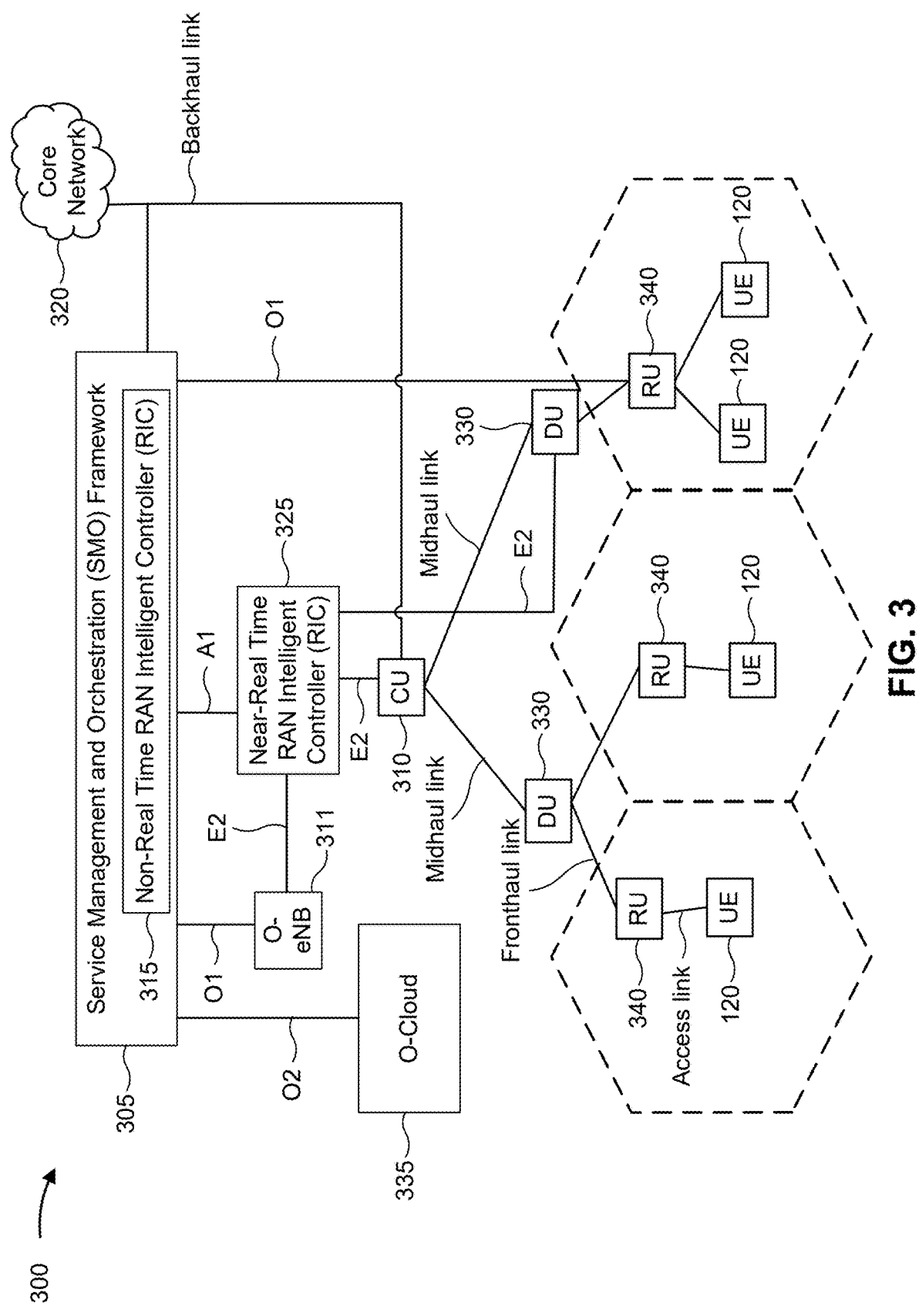
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual centralized unit (VCU), a virtual distributed unit (VDU), or a virtual radio unit (VRU)).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 335) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
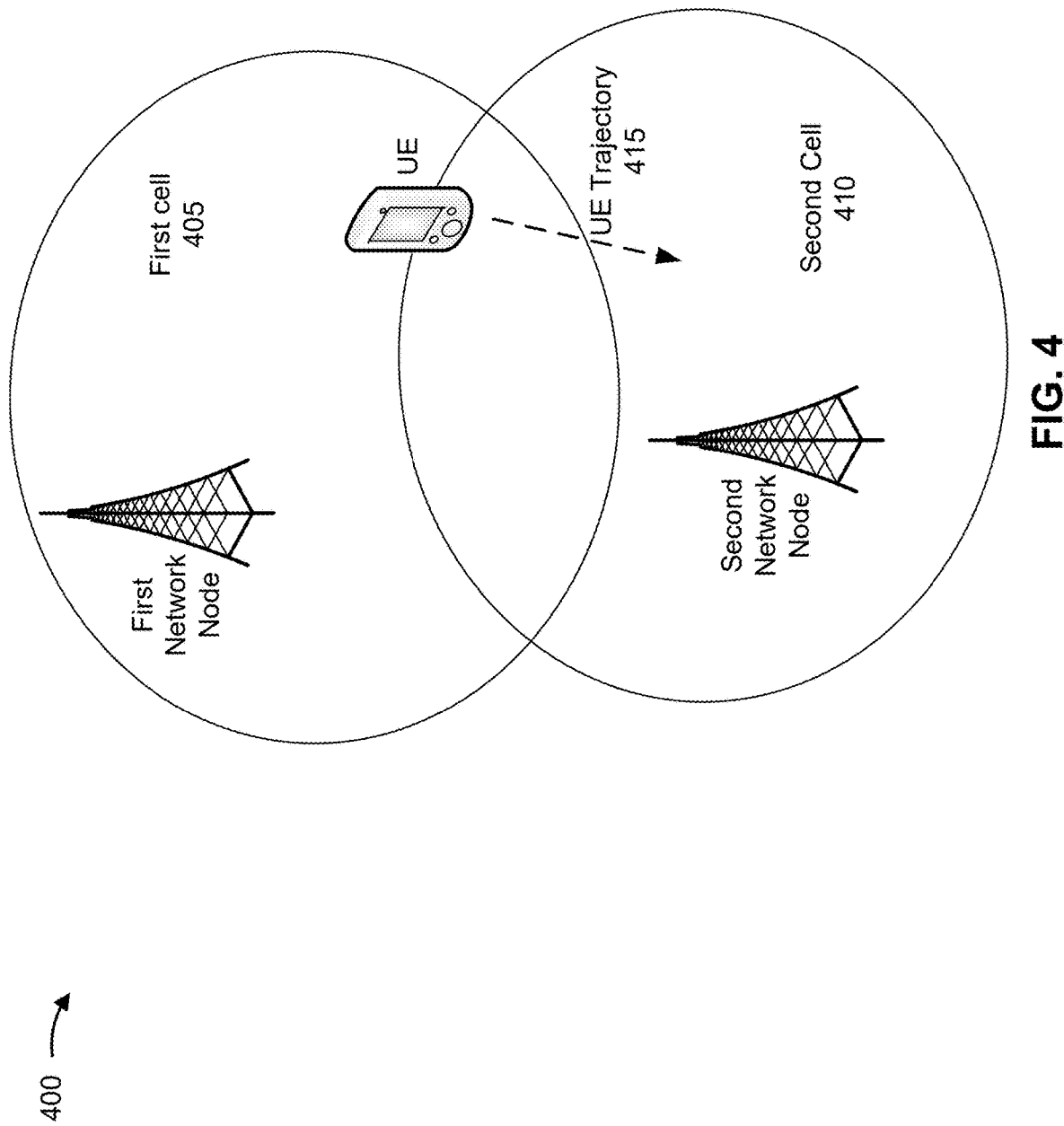
FIG. 4 is a diagram illustrating an example of a handover event, in accordance with the present disclosure.

FIG. 4 is a diagram illustrating an example 400 of a handover event, in accordance with the present disclosure. As shown in FIG. 4, a UE may communicate with a wireless network via one or more network nodes (e.g., base stations or devices of a base station, such as an RU).

As shown in FIG. 4, the UE may have previously established a connection on a first cell 405 of the wireless network. The first cell 405 may be supported and/or provided by a first network node. The wireless network may include a second cell 410 that is a neighbor cell to the first cell 405. The second cell 410 may be supported and/or provided by a second network node.

As shown in FIG. 4, the UE may have a UE trajectory 415 that points in a direction of the second network node and/or a location with increased signal strengths from the second cell 410 and/or decreased signal strengths from the first cell 405. For example, the UE may be carried on a vehicle or a person in the direction of the UE trajectory.

Based at least in part on the UE having the UE trajectory 415 that is associated with an increase of signal strengths from the second cell 410 and/or a decrease of signal strengths from the first cell 405, the UE may transmit a report that indicates that a handover may benefit the UE. For example, the UE may transmit, to the first network node, a measurement report that the first network node may use to determine that a handover is appropriate. The first network node or another network node may initiate a handover in which the UE may be dropped from the first cell 405 and connected to the second cell 410.

As indicated above, FIG. 4 is provided as an example. Other examples may differ from what is described with regard to FIG. 4. For example, rather than movement toward the second cell, an obstacle may cause one or more conditions that increases signal strengths from the second cell 410 and/or decreases signal strengths from the first cell 405.

Figure 5:
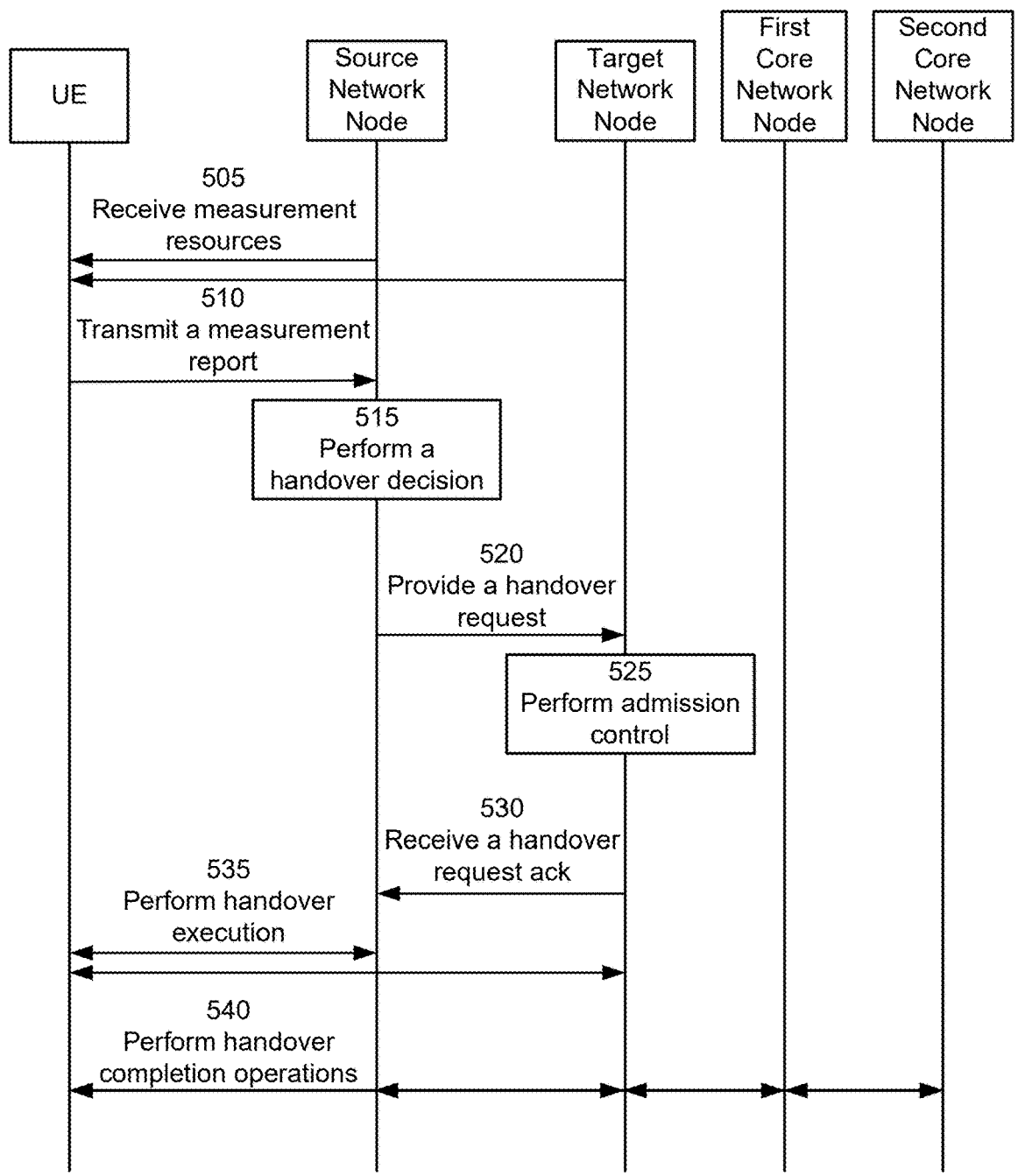
FIG. 5 is a diagram illustrating a handover process, in accordance with the present disclosure.

FIG. 5 is a diagram illustrating a handover process 500, in accordance with the present disclosure. As shown in FIG. 5, a UE may communicate via one or more RF network nodes. For example, the UE may have previously established a wireless connection with a source network node (e.g., a source base station). A target network node may be a neighbor node to the source network node (e.g., providing and/or supporting a cell that is a neighbor cell to a cell provided and/or supported by the target network node). The source network node and/or the target network node may communicate with a first core network node (e.g., an access and mobility management function (AMF)) and/or a second core network node (e.g., a user plane function) as part of a handover process. The UE may have established a connection with the second core network node or another network node to receive user data via the source network node.

As shown by reference number 505, the UE may receive measurement resources from the source network node and the target network node. For example, the UE may receive and measure reference signals from the source network node and the target network node. The reference signals may include synchronization signal blocks (SSBs) and/or other reference signal types.

As shown by reference number 510, the UE may transmit a measurement report to the source network node. The measurement report may indicate signal strengths from the source network node and the target network node as measured at the UE. The measurement report may indicate that a signal strength from the target network node is stronger than a signal strength from the source network node.

As shown by reference number 515, the source network node may perform a handover decision. For example, the source network node may determine to perform a handover based at least in part on the measurement report.

As shown by reference number 520, the source network node may provide a handover request to the target network node. The handover request may indicate the UE and/or one or more parameters associated with the UE for the target network node to use to determine whether to admit the UE to a cell provided or supported by the target network node.

As shown by reference number 525, the target network node may perform admission control to determine whether to admit the UE to the cell provided or supported by the target network node. The target network node may determine whether to admit the UE based at least in part on an identification of the UE, the one or more parameters, traffic at the target UE, and/or a data type or volume associated with the UE, among other examples.

As shown by reference number 530, the target network node may provide a handover request acknowledgment (ACK) to the source network node. The handover request ACK may indicate that the source network node may initiate the handover to the target network node. In some networks, the target network node may provide one or more parameters (e.g., timing, supported communication types, and/or numerology, among other examples) for the source network node to transmit to the UE to assist in the handover.

As shown by reference number 535, the UE, the source network node, and the target network node may perform handover execution. The handover execution may include multiple operations and/or communications between the UE, the source network node, and the target network node. For example, the source network node may transmit, and the UE may receive, an RRC reconfiguration with mobility message that indicates one or more parameters (e.g., timing, numerology, and/or parameters associated with a PRACH of the cell associated with the target network node, among other examples) for the UE to synchronize with the target network node. The UE may synchronize to the cell provided and/or supported by the target network node based at least in part on the RRC reconfiguration with mobility message.

The source network node may provide a sequence number (SN) status transfer to the target network node to assist in receiving the UE in the handover. Additionally, or alternatively, the source network node may forward user data to the target network node for transmission to the UE upon handover completion.

The UE may transmit, and the target network node may receive, a connection request message. For example, the UE may transmit a random access channel communication. The target network node and the UE may communicate one or more additional access messages (e.g., via the PRACH). The target network node may transmit an indication of a timing advance to the UE for the UE to use to synchronize and/or refine synchronization with the target network node. The UE may transmit an RRC reconfiguration complete message to the target network node to indicate that the UE is connected to the target network node and/or that the UE is released from a connection with the source network node.

As shown by reference number 540, the UE and the target network node may perform handover completion operations. The handover completion operations may include transmitting and receiving user data based at least in part on having established the connection. The target network node may provide the user data to the second core network node.

In some networks, the target network node may provide a path switch request to the first core network node, and the first core network node and the second core network node may perform a path switching operation to identify and/or optimize a path from the target network node to the second core network node. For example, the target network node may provide the path switch request based at least in part on the target network node being unaware of the second core network node as an end node for communications with the UE and/or the target network node being unaware of a networking path to the second core network node. The first core network node and/or the second core network node may provide an end marker to the source network node, which may provide the end marker to the target network node. In this way, the source network node may assist the target network node in identifying the second core network node as an end node for communications with the UE. Based at least in part on the target network node obtaining the end marker, the target network node may provide user data to, and/or receive user data from, the second core network node.

Additionally, or alternatively, the target network node may transmit a UE context release message to the source network node. Based at least in part on receiving the UE context release message, the source network node may delete or archive information associated with managing a connection with the UE.

As indicated above, FIG. 5 is provided as an example. Other examples may differ from what is described with regard to FIG. 5.

In some networks, the handover process described in connection with FIG. 5 may cause an interruption of a connection between a UE and an application server (e.g., a device that includes a user plane function (UPF) or a third party server that provides data for the UE to the UPF or another core network node). For example, the connection may be interrupted while performing the handover execution described in connection with reference number 535. In some networks, the connection may be interrupted for an amount of time in a range of approximately 30 milliseconds to approximately 50 milliseconds (e.g., a time between receiving the RRC reconfiguration with mobility message from the source network node and transmitting the RRC reconfiguration complete message to the target network node). The interruption may cause a communication error and/or may degrade performance in communications that involve, for example, a video stream. For example, the interruption may cause a communication error and/or degradation of performance for an a data stream (e.g., extended reality stream, virtual reality stream and/or augmented reality stream, among other examples). The interruption may cause the UE to skip one or more frames that are intended by the application server for presentation to a user of the UE.

In some aspects described herein, the UE may determine that a handover is likely for the UE, where the UE is in communication with the application server to receive a data stream (e.g., XR data and/or a real-time video communication). For example the UE may determine that the handover is likely for the UE based at least in part on network conditions and/or a measurement report that indicates that a neighbor cell has a signal strength that is stronger than a signal strength associated with an active cell. In some aspects, the UE may be configured with a conditional handover (e.g., conditional HO) that configures the UE (e.g., via an RRCReconfiguration message) to execute a handover based at least in part on satisfaction of one or more conditional handover execution conditions.

The UE may provide an indication that the handover is likely for the UE to the application server. For example, the UE may provide the indication via an application programming interface (API) using an application layer communication. In some aspects, the UE may provide the indication before beginning performance of the handover execution (e.g., which may begin the interruption). The UE may also provide an indication that a handover is complete or that a handover is no longer likely. In some aspects, the UE may use the API to provide a pre-handover indication, a type of handover (e.g., NR-NR, LTE-NR, or LTE-LTE among other examples), an expected handover duration (e.g., a length of time of the interruption), a pre-handover cancelation indication (e.g., to indicate that the pre-handover indication is no longer valid), a handover start indication (e.g., based at least in part on receiving a handover command), a handover end indication (e.g., based at least in part on completion of the handover execution), and/or a handover failure indication (e.g., based at least in part on failure to handover to a neighbor cell), among other examples. In this way, the application server may perform one or more mitigation actions to reduce an impact of a communication interruption associated with the handover.

In some aspects, the application server may receive the indication (e.g., that an upcoming handover is known or predicted with a high confidence (e.g., satisfying a threshold likelihood)) approximately 15 milliseconds, for example, prior to a start of data interruption. In some aspects, the application server may adapt application behavior, based at least in part on receiving the indication that the handover is likely, to reduce packet and/or video frame losses.

In some aspects, the application server may proactively insert an I-frame into a video stream after handover completion. For example, the application server may insert the I-frame after the handover completion and independently from (e.g., without waiting for) reception of an indication of a packet loss and/or packet error from the UE. Unlike P-frames and B-frames, an I-frame does not need other video frames for decoding. For example, an I-frame may be decoded even if a previous frame is lost during the handover. A B-frame is not suitable for real-time low-latency multimedia traffic (it requires a forward frame, and P-frames rely on a previous frame for decoding). If an intermediate frame is missing, consecutive P-frames cannot be decoded until the next I-frame is delivered. In this way, providing an I-frame after handover completion may reduce a number of frames that cannot be decoded based at least in part on the handover. This may reduce communication error and improve performance in communications that involve a video stream (e.g., an XR stream).

In some aspects, the application server may adjust a de-jitter buffer depth based at least in part on receiving the indication that the handover is likely. The de-jitter buffer depth may be used to absorb the delay variation in the video frame delivery due to handover. For example, the application server may adapt to a likely handover interruption by adjusting a target delay value (e.g., a buffer depth) such that the updated target delay value is at least equal to an expected handover interruption time. In this way, the application server may delay packets before the interruption to reduce degradation of the stream during the interruption.

In some aspects, the application server may throttle a throughput (e.g., a data rate) based at least in part on receiving the indication that the handover is likely. For example the application server may temporarily reduce the throughput to reduce a likelihood of packet loss and/or video frame loss during the handover. After receiving an indication that the handover is completed, the application server may regress to a throughput used before receiving the indication that the handover is likely.

In some aspects, the application server may increase an FEC rate based at least in part on receiving the indication that the handover is likely. For example, the application server may increase the FEC rate to increase redundancy that can be used to account for lost packets during the handover. In some aspects, the UE may indicate, to the application server, a requested FEC rate or a request to increase the FEC rate.

In some aspects, the application server may skip one or more frames based at least in part on receiving the indication that the handover is likely. For example, the application server may skip a number of frames that is based at least in part on an expected length of time of the communication interruption for the handover. By skipping the one or more frames, the application server may begin transmitting frames after the communication interruption with an increased likelihood of the frames being on time (e.g., received in time to be rendered by the UE). In some aspects, a first frame after the skipped one or more frames may be an I-frame.

Figure 6:
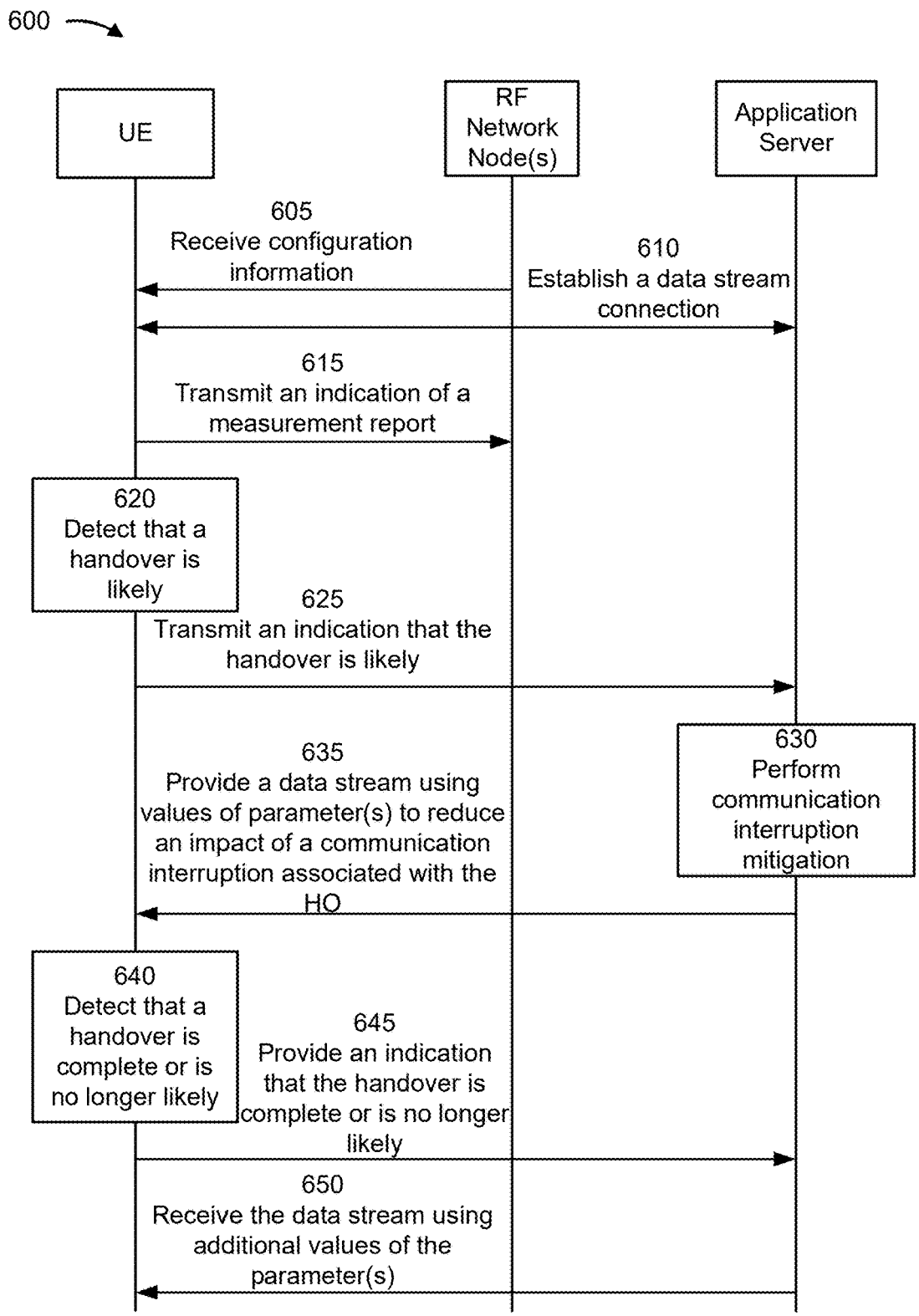
FIGS. 6-8 are diagrams illustrating examples associated with handover indications for data stream application, in accordance with the present disclosure.

FIG. 6 is a diagram of an example 600 associated with handover indications for data stream application, in accordance with the present disclosure. As shown in FIG. 6, one or more RF network nodes (e.g., base station 110) may communicate with a UE (e.g., UE 120). In some aspects, the one or more RF network nodes and the UE may be part of a wireless network (e.g., wireless network 100) that also includes, or is connected to, an application server. The UE and a first RF network node of the one or more RF network nodes may have established a wireless connection prior to operations shown in FIG. 6. In some aspects, a data stream application may include an XR application.

As shown by reference number 605, the first network node may transmit, and the UE may receive, configuration information. In some aspects, the UE may receive the configuration information via one or more of RRC signaling, one or more MAC control elements (CEs), and/or downlink control information (DCI), among other examples. In some aspects, the configuration information may include an indication of one or more configuration parameters (e.g., already known to the UE and/or previously indicated by the first network node or another network device) for selection by the UE, and/or explicit configuration information for the UE to use to configure the UE, among other examples.

In some aspects, the configuration information may indicate that the UE is to provide an indication, to one or more connected application servers, based at least in part on the UE determining that a handover is likely. In some aspects, the configuration information may include one or more information elements associated with the one or more connected application servers. In some aspects, the configuration information may indicate one or more conditions that indicate when a handover is likely. For example, the configuration information may configure one or more parameters for a conditional handover process.

The UE may configure itself based at least in part on the configuration information. In some aspects, the UE may be configured to perform one or more operations described herein based at least in part on the configuration information.

As shown by reference number 610, the UE may establish a data stream connection (e.g., an data stream connection and/or a real-time video connection) with the application server. For example, the UE may establish the data stream connection via one or more application layer or user plane communications. In some aspects, establishing the data stream connection may include establishing and/or configuring an API for providing information associated with an expected handover to reduce an impact of a communication interruption associated with the handover. In some aspects, the data stream may include XR data and/or a real-time video communication, among other examples.

As shown by reference number 615, the UE may transmit, and the first RF network node may receive, an indication of a measurement report. In some aspects, the measurement report may indicate one or more measurements (e.g., at the UE) of reference signals transmitted by the first RF network node (e.g., a source network node) and reference signals transmitted by a second RF network node (e.g., a target network node). For example, the measurement report may indicate that a signal strength associated with the second RF network node is stronger (e.g., by a threshold amount) than a signal strength associated with the first RF network node.

As shown by reference number 620, the UE may detect that a handover is likely. In some aspects, the UE may detect that the handover is likely based at least in part on the measurement report. For example, the UE may detect that the handover is likely based at least in part on indicating, within the measurement report, that network conditions (e.g., measured signal strengths) for communicating with the second RF network node are better suited for the UE than conditions for communication with the first RF network node. In some aspects, the UE may detect and/or determine that a handover is likely based at least in part on the neighbor cell having a configuration for improved spectral efficiency, increased bandwidth per UE, and/or other improvements in communication for the UE, among other examples.

As shown by reference number 625, the UE may provide, to the application server, an indication that the handover is likely. For example, the UE may transmit, to the first RF network node, a message that is provided from the first RF network node to the application server (e.g., via an application layer communication). In some aspects, the UE may use an API associated with reporting handovers to provide the indication to the application server.

In some aspects, the UE may provide the indication that the handover is likely based at least in part on a measurement report indicating that an active cell associated with the UE is associated with a first signal strength that is weaker than a second signal strength associated with a neighbor cell associated with the UE. In some aspects, the UE may provide the indication, and the application server may receive the indication, before a handover operation begins (e.g., before performing the handover execution).

As shown by reference number 630, the application server may perform communication interruption mitigation. For example, the application server may configure one or more parameters for providing data stream to the UE, where the one or more parameters are associated with a reduction of an impact of communication interruption associated with the handover. The one or more parameters may include a frame type of a frame of the data stream provided to the UE, a de-jitter buffer depth of the data stream provided to the UE, a throttle rate of the data stream provided to the UE, a number of frames to skip during the communication interruption, and/or an FEC rate of the data provided to the UE.

In some aspects, the application server may provide the data stream with a frame type to reduce the impact of the communication interruption associated with the handover by transmitting an I-frame after completion of the handover independently from (e.g., in the absence of or without waiting for) reception of an indication of a packet loss from the UE. The I-frame may be a frame of the data stream that does not rely on a previous or subsequent frame for decoding. In some aspects, the application server may provide the data stream using a value of the de-jitter buffer depth to reduce the impact of the communication interruption associated with the handover by configuring the de-jitter buffer depth such that a target delay value is based at least in part on an expected handover interruption time. For example, the de-jitter buffer depth may be configured to match (e.g., to be the same as, to be a buffer amount greater than, or to be a buffer percentage greater than) an expected handover interruption time.

In some aspects, the application server may provide the data stream using a value of the throttle rate to reduce the impact of the communication interruption associated with the handover by reducing a video throughput, relative to a throughput used before transmission of the indication that the handover is likely, until completion of the handover. In some aspects, the application server may provide the data stream using a value of the FEC rate to reduce the impact of the communication interruption associated with the handover by increasing an FEC rate, relative to an FEC rate used before transmission of the indication that the handover is likely, until completion of the handover.

In some aspects, the application server may provide the data stream using a number of frames to skip during the communication interruption associated with the handover. For example, the application server may skip (e.g., blank, empty a buffer, and/or refrain from generating) frames during the communication interruption. In some aspects, the number of frames to skip may be based at least in part on an expected length of the communication interruption. In this way, the skipped frames may fail to be transmitted and frames following the communication interruption may be received before associated deadlines instead of having the frames following the communication interruption being delayed to allow for transmission of the frames originally scheduled for transmission during the communication interruption. In this way, a number of frames that miss associated deadlines, including the skipped frames, may be reduced.

As shown by reference number 635, the application server may provide, and the UE may receive (e.g., via the first RF network node and/or via the second RF network node), the data stream using values of the one or more parameters to reduce the impact of the communication interruption associated with the handover.

As shown by reference number 640, the UE may detect that the handover is complete or is no longer likely. For example, the UE may detect that the handover is complete based at least in part on transmitting an RRC reconfiguration complete message to the second RF network node. The UE may detect that the handover is no longer likely based at least in part on transmitting an additional measurement report that indicates that the UE would no longer benefit from the handover (e.g., a signal strength associated with the first RF node became stronger than the signal strength associated with the second RF node, or the handover was rejected by the second RF node, among other examples).

As shown by reference number 645, the UE may provide, and the application server may receive (e.g., via the second RF network node), an indication that the handover is complete or is no longer likely.

As shown by reference number 650, the UE may receive, and the application server may provide, the data stream using one or more additional values of the one or more parameters. For example, the application server may provide the data stream using one or more values that were used before (e.g., prior to) receiving the indication that the handover is likely for the UE. Additionally, or alternatively, the one or more additional values may not be configured to reduce the impact of the communication interruption associated with the handover. For example, the one or more values may be configured to improve image quality, conserve communication and/or network resources, and/or otherwise operate without attempting to reduce the impact of a communication interruption associated with a handover.

Based at least in part on the application server performing communication interruption mitigation by using the one or more values of the one or more parameters, the application server may reduce degradation of the XR stream (e.g., reduce packet errors and/or missed frames) and/or may conserve resources that may have otherwise been used to recover from missed frames during the handover.

As indicated above, FIG. 6 is provided as an example. Other examples may differ from what is described with regard to FIG. 6.

Figure 7:
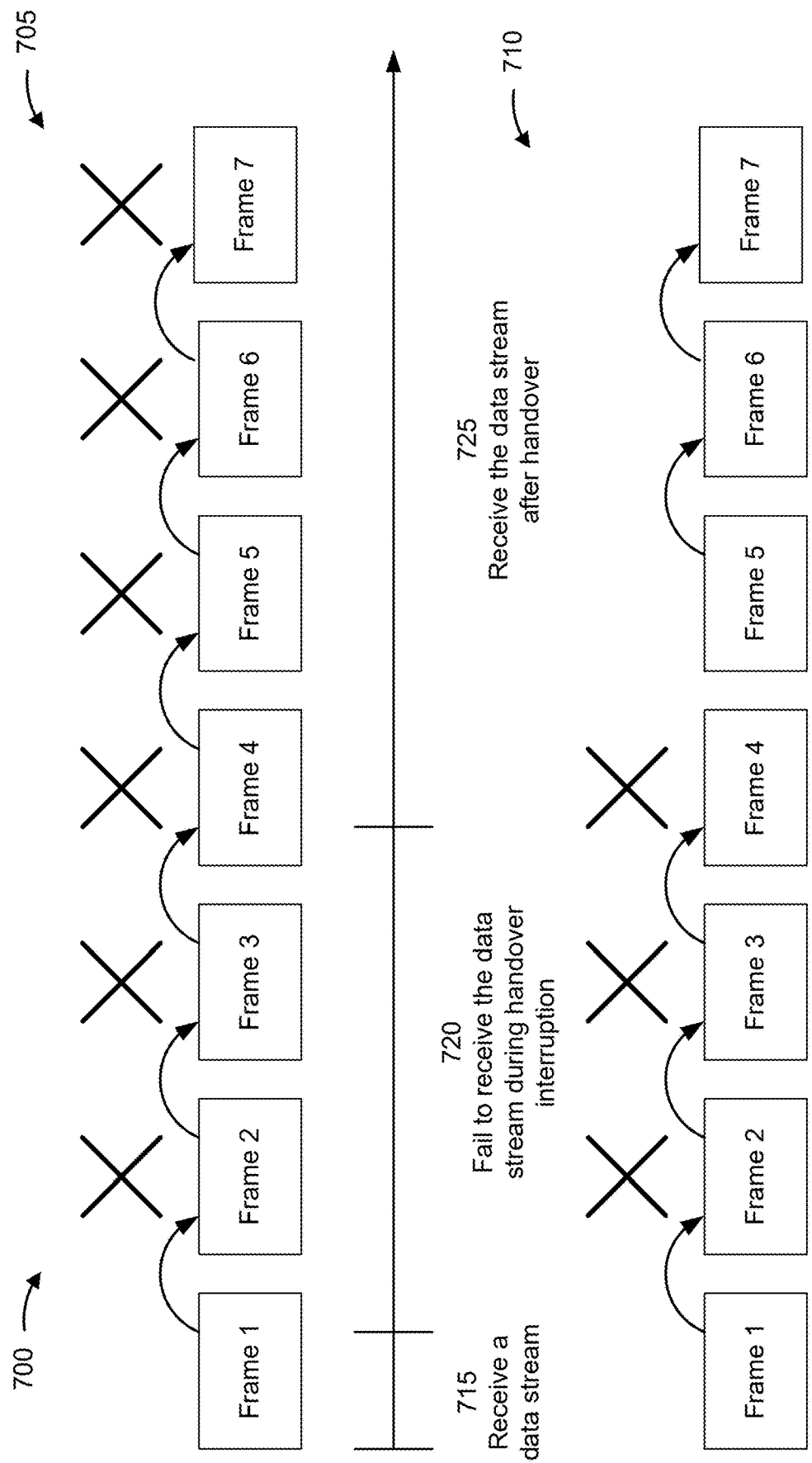

FIG. 7 is a diagram of an example 700 associated with handover indications for data stream application, in accordance with the present disclosure. As shown in FIG. 7, an application server may communicate with a UE (e.g., UE 120). The UE and the application server may have established a connection prior to operations shown in FIG. 7 (e.g., via a user plane and/or application layer communications). In some aspects, a data stream application may include an XR application.

As shown in FIG. 7, and by reference number 705, the application server may be configured to provide 7 frames of a data stream (e.g., XR data and/or a real-time video communication) to the UE. As shown in FIG. 7, frame 1 may be an I-frame that can be decoded without dependency on a previous or subsequent frame. Each of frames 2-7 are P-frames that are each dependent on a previous frame. The P-frames may include a reduced amount of data based at least in part on applying a set of changes to a previously decoded frame. In this way, the P-frames may conserve network and communication resources. However, if a previous frame is not received or decoded, the P-frame is discarded, and the UE skips the P-frame.

As shown by reference number 710, frame 1 is an I-frame and frame 5 is an I-frame, each of which can be decoded without dependency on a previous frame. In some aspects, the application server may configure frame 5 as an I-frame based at least in part on receiving an indication that a handover is likely and/or that a handover is completed or no longer expected.

As shown by reference number 715, the UE may receive the data stream. Based at least in part on not yet beginning a handover, the UE may decode the data stream. As shown by reference number 720, the UE may fail to receive the data stream during handover interruption. The handover interruption may prevent the UE from receiving frames 2-4. As shown by reference number 725, the UE may again receive the data stream after the handover.

In the example shown by reference number 705, the UE may fail to decode any of frames 2-7 based at least in part on dependence on a previous frame that was not decoded. In the example shown by reference number 710, the UE may fail to decode any of frames 2-4 and may successfully decode frames 5-7 based at least in part on the application server transmitting frame 5 as an I-frame. In this way, the application server may reduce an impact of the communication interruption associated with the handover.

As indicated above, FIG. 7 is provided as an example. Other examples may differ from what is described with regard to FIG. 7.

Figure 8:
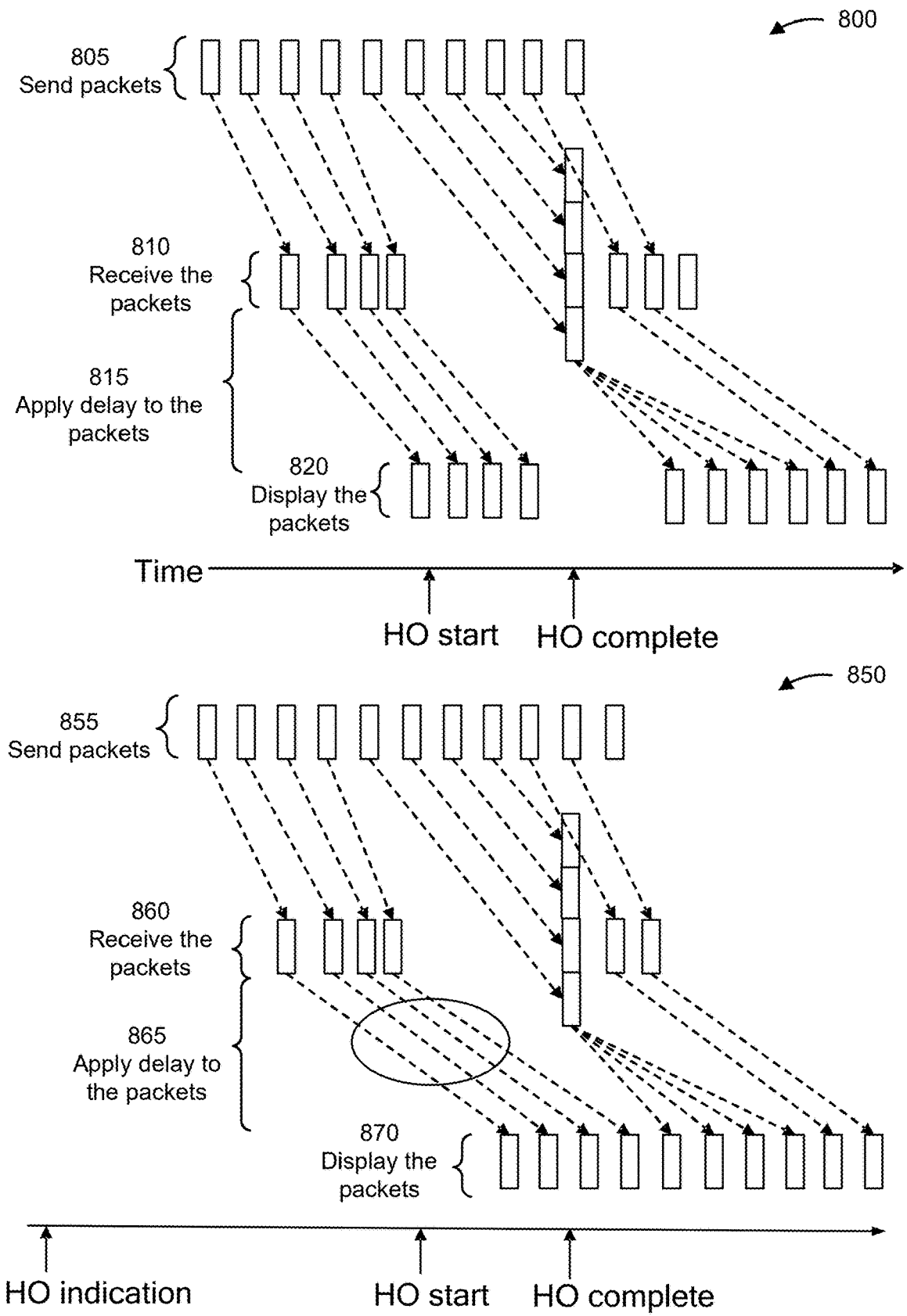

FIG. 8 is a diagram of an example 800 associated with handover indications for data stream application, in accordance with the present disclosure. As shown in FIG. 8, an application server may communicate with a UE (e.g., UE 120). The UE and the application server may have established a connection prior to operations shown in FIG. 8 (e.g., via a user plane and/or application layer communications). In some aspects, a data stream application may include an XR application.

As shown in FIG. 8, and by reference number 800, the application may provide a data stream (e.g., XR data and/or a real-time video communication) without adjusting a de-jitter buffer depth to reduce an impact of a communication interruption associated with a handover. As shown by reference number 805, the application server may transmit packets including the data stream. As shown by reference number 810, the UE may receive the packets. As shown by reference number 815, the UE may apply a delay to the packets based at least in part on a de-jitter buffer that is not configured based at least in part on a handover. As shown by reference number 820, the UE may display the data stream carried in the packets (e.g., based at least in part on providing rendered data to a display that is local to the UE or to a display device that is in connection with the UE, among other examples). As shown by reference number 820, the UE may display the packets with a gap associated with the communication interruption associated with the handover. This degrades performance of a communication link between the UE and the application server and degrades performance by the UE in displaying the data stream (e.g., an image of the data stream).

As shown by reference number 850 the application may provide data stream with adjusting a de-jitter buffer depth to reduce an impact of a communication interruption associated with a handover. As shown by reference number 855, the application server may transmit the packets that carry the data stream. As shown by reference number 860, the UE may receive the packets. As shown by reference number 865, the UE may apply a delay to the packets based at least in part on a de-jitter buffer that is configured to reduce an impact of a communication interruption that is based at least in part on a handover. As shown by reference number 870, the UE may display the data stream carried in the packets (e.g., based at least in part on providing rendered data to a display that is local to the UE or to a display device that is in connection with the UE, among other examples). As shown by reference number 870, the UE may display the packets without a gap associated with the communication interruption associated with the handover. This improves performance of a communication link between the UE and the application server and improves performance by the UE in displaying the data stream.

As indicated above, FIG. 8 is provided as an example. Other examples may differ from what is described with regard to FIG. 8.

Figure 9:
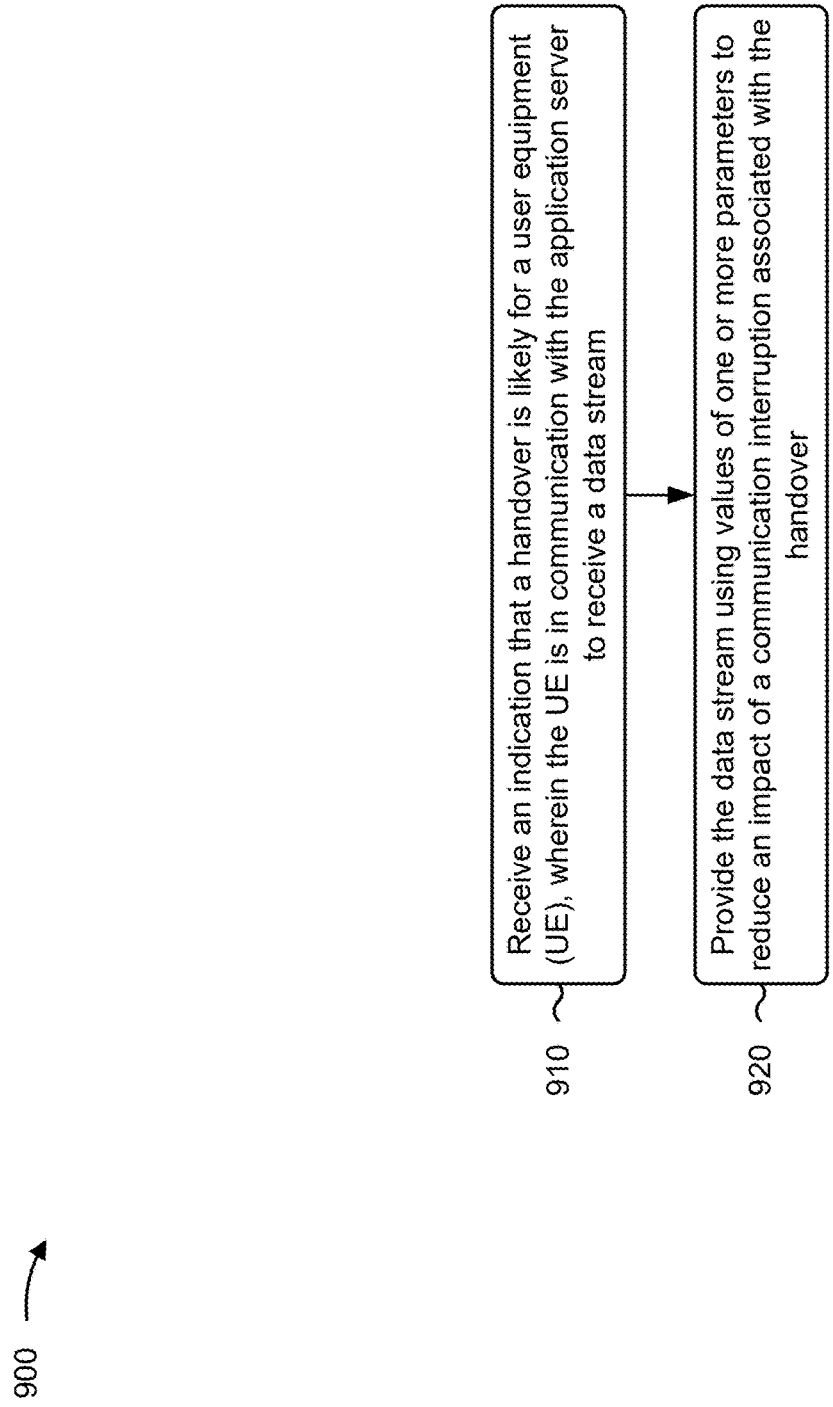
FIGS. 9-10 are diagrams illustrating example processes associated with handover indications for data stream application, in accordance with the present disclosure.

FIG. 9 is a diagram illustrating an example process 900 performed, for example, by an application server, in accordance with the present disclosure. Example process 900 is an example where the application server (e.g., application server of FIGS. 6-8) performs operations associated with handover indication for XR application.

As shown in FIG. 9, in some aspects, process 900 may include receiving an indication that a handover is likely for a UE, wherein the UE is in communication with the application server to receive a data stream (block 910). For example, the application server (e.g., using communication manager 150, input component 1140, and/or communication component 1160, depicted in FIG. 11) may receive an indication that a handover is likely for a UE, wherein the UE is in communication with the application server to receive a data stream, as described above.

As further shown in FIG. 9, in some aspects, process 900 may include providing the data stream using values of one or more parameters to reduce an impact of a communication interruption associated with the handover (block 920). For example, the application server (e.g., using communication manager 150, output component 1150, and/or communication component 1160, depicted in FIG. 11) may provide the data stream using values of one or more parameters to reduce an impact of a communication interruption associated with the handover, as described above.

Process 900 may include additional aspects, such as any single aspect or any combination of aspects described below and/or in connection with one or more other processes described elsewhere herein.

In a first aspect, the one or more parameters comprise one or more of a frame type of a frame of the data stream provided based at least in part on the handover, a de-jitter buffer depth of the data stream provided based at least in part on the handover, a throttle rate of the data stream provided based at least in part on the handover, a number of frames to skip during the communication interruption associated with the handover, or an FEC rate.

In a second aspect, alone or in combination with the first aspect, providing the data stream using a value of the frame type of the frame of the data stream to reduce the impact of the communication interruption associated with the handover comprises transmitting an I-frame after completion of the handover independently from receiving an indication of a packet loss from the UE.

In a third aspect, alone or in combination with one or more of the first and second aspects, the I-frame is a frame of the data stream that does not rely on a previous or subsequent frame for decoding.

In a fourth aspect, alone or in combination with one or more of the first through third aspects, providing the data stream using a value of the de-jitter buffer depth to reduce the impact of the communication interruption associated with the handover comprises configuring the de-jitter buffer depth such that a target delay value is based at least in part on an expected handover interruption time.

In a fifth aspect, alone or in combination with one or more of the first through fourth aspects, providing the data stream using a value of the throttle rate to reduce the impact of the communication interruption associated with the handover comprises reducing a video throughput, relative to a throughput used before transmission of the indication that the handover is likely, until completion of the handover.

In a sixth aspect, alone or in combination with one or more of the first through fifth aspects, providing the data stream using a value of the FEC rate to reduce the impact of the communication interruption associated with the handover comprises increasing an FEC rate, relative to an FEC rate used before transmission of the indication that the handover is likely, until completion of the handover.

In a seventh aspect, alone or in combination with one or more of the first through sixth aspects, receiving the indication that the handover is likely for the UE comprises one or more of receiving the indication based at least in part on a measurement report indicating that an active cell associated with the UE is associated with a first signal strength that is weaker than a second signal strength associated with a neighbor cell associated with the UE, or receiving the indication that the handover is likely for the UE before a handover operation begins.

In an eighth aspect, alone or in combination with one or more of the first through seventh aspects, process 900 includes receiving an indication that the handover is no longer likely for the UE, and providing, after receiving the indication the handover is no longer likely for the UE, the data stream using additional values of the one or more parameters that are not configured to reduce the impact of the communication interruption associated with the handover.

In a ninth aspect, alone or in combination with one or more of the first through eighth aspects, the additional values of the one or more parameters comprises values of the one or more parameters used before receiving the indication that the handover is likely for the UE.

In a tenth aspect, alone or in combination with or more of the first through ninth aspects, the data stream comprises one or more of: XR data, or a real-time video communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with the present disclosure. Example process 1000 is an example where the UE (e.g., UE 120) performs operations associated with handover indication for XR application.

As shown in FIG. 10, in some aspects, process 1000 may include transmitting, to an application server, an indication that a handover is likely for the UE, wherein the UE is in communication with the application server to receive a data stream (block 1010). For example, the UE (e.g., using communication manager 140 and/or transmission component 1204, depicted in FIG. 12) may transmit, to an application server, an indication that a handover is likely for the UE, wherein the UE is in communication with the application server to receive a data stream, as described above.

As further shown in FIG. 10, in some aspects, process 1000 may include receiving the data stream having values of one or more parameters applied to reduce an impact of a communication interruption associated with the handover (block 1020). For example, the UE (e.g., using communication manager 140 and/or reception component 1202, depicted in FIG. 12) may receive the data stream having values of one or more parameters applied to reduce an impact of a communication interruption associated with the handover, as described above.

Process 1000 may include additional aspects, such as any single aspect or any combination of aspects described below and/or in connection with one or more other processes described elsewhere herein.

In a first aspect, the one or more parameters comprise one or more of a frame type of a frame of the data stream provided based at least in part on the handover, a de-jitter buffer depth of the data stream provided based at least in part on the handover, a throttle rate of the data stream provided based at least in part on the handover, a number of frames to skip during the communication interruption associated with the handover, or an FEC rate.

In a second aspect, alone or in combination with the first aspect, receiving the data stream using a value of the frame type of the frame of the data stream to reduce the impact of the communication interruption associated with the handover comprises receiving an I-frame after completion of the handover independently from receiving an indication of a packet loss from the UE.

In a third aspect, alone or in combination with one or more of the first and second aspects, the I-frame is a frame of the data stream that does not rely on a previous or subsequent frame for decoding.

In a fourth aspect, alone or in combination with one or more of the first through third aspects, receiving the data stream using a value of the de-jitter buffer depth to reduce the impact of the communication interruption associated with the handover comprises receiving the data stream having the de-jitter buffer depth applied such that a target delay value is based at least in part on an expected handover interruption time.

In a fifth aspect, alone or in combination with one or more of the first through fourth aspects, receiving the data stream using a value of the throttle rate to reduce the impact of the communication interruption associated with the handover comprises receiving the data stream having a reduced video throughput, relative to a video throughput used before transmission of the indication that the handover is likely, until completion of the handover.

In a sixth aspect, alone or in combination with one or more of the first through fifth aspects, receiving the data stream using a value of the FEC rate to reduce the impact of the communication interruption associated with the handover comprises receiving the data stream having an increased FEC rate, relative to an FEC rate used before transmission of the indication that the handover is likely, until completion of the handover.

In a seventh aspect, alone or in combination with one or more of the first through sixth aspects, transmitting the indication that the handover is likely for the UE comprises one or more of transmitting the indication based at least in part on a measurement report indicating that an active cell associated with the UE is associated with a first signal strength that is weaker than a second signal strength associated with a neighbor cell associated with the UE, or transmitting the indication that the handover is likely for the UE before a handover operation begins.

In an eighth aspect, alone or in combination with one or more of the first through seventh aspects, process 1000 includes transmitting an indication that the handover is no longer likely for the UE, and receiving, after transmitting the indication the handover is no longer likely for the UE, the data stream using additional values of the one or more parameters that are not configured to reduce the impact of the communication interruption associated with the handover.

In a ninth aspect, alone or in combination with one or more of the first through eighth aspects, the additional values of the one or more parameters comprises values of the one or more parameters used before transmission of the indication that the handover is likely for the UE.

In a tenth aspect, alone or in combination with or more of the first through ninth aspects, the data stream comprises one or more of: XR data, or a real-time video communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of example components of a device 1100, which may correspond to the application server of FIGS. 6-8 and/or a user plane function. In some implementations, the application server of FIGS. 6-8 and/or the user plane function include one or more devices 1100 and/or one or more components of device 1100. As shown in FIG. 11, device 1100 may include a bus 1110, a processor 1120, a memory 1130, an input component 1140, an output component 1150, and a communication component 1160.

Bus 1110 includes one or more components that enable wired and/or wireless communication among the components of device 1100. Bus 1110 may couple together two or more components of FIG. 11, such as via operative coupling, communicative coupling, electronic coupling, and/or electric coupling. Processor 1120 includes a central processing unit, a graphics processing unit, a microprocessor, a controller, a microcontroller, a digital signal processor, a field-programmable gate array, an application-specific integrated circuit, and/or another type of processing component. Processor 1120 is implemented in hardware, firmware, or a combination of hardware and software. In some implementations, processor 1120 includes one or more processors capable of being programmed to perform one or more operations or processes described elsewhere herein.

Memory 1130 includes volatile and/or nonvolatile memory. For example, memory 1130 may include random access memory (RAM), read only memory (ROM), a hard disk drive, and/or another type of memory (e.g., a flash memory, a magnetic memory, and/or an optical memory). Memory 1130 may include internal memory (e.g., RAM, ROM, or a hard disk drive) and/or removable memory (e.g., removable via a universal serial bus connection). Memory 1130 may be a non-transitory computer-readable medium. Memory 1130 stores information, instructions, and/or software (e.g., one or more software applications) related to the operation of device 1100. In some implementations, memory 1130 includes one or more memories that are coupled to one or more processors (e.g., processor 1120), such as via bus 1110.

Input component 1140 enables device 1100 to receive input, such as user input and/or sensed input. For example, input component 1140 may include a touch screen, a keyboard, a keypad, a mouse, a button, a microphone, a switch, a sensor, a global positioning system sensor, an accelerometer, a gyroscope, and/or an actuator. Output component 1150 enables device 1100 to provide output, such as via a display, a speaker, and/or a light-emitting diode. Communication component 1160 enables device 1100 to communicate with other devices via a wired connection and/or a wireless connection. For example, communication component 1160 may include a receiver, a transmitter, a transceiver, a modem, a network interface card, and/or an antenna.

Device 1100 may perform one or more operations or processes described herein. For example, a non-transitory computer-readable medium (e.g., memory 1130) may store a set of instructions (e.g., one or more instructions or code) for execution by processor 1120. Processor 1120 may execute the set of instructions to perform one or more operations or processes described herein. In some implementations, execution of the set of instructions, by one or more processors 1120, causes the one or more processors 1120 and/or the device 1100 to perform one or more operations or processes described herein. In some implementations, hardwired circuitry is used instead of or in combination with the instructions to perform one or more operations or processes described herein. Additionally, or alternatively, processor 1120 may be configured to perform one or more operations or processes described herein. Thus, implementations described herein are not limited to any specific combination of hardware circuitry and software.

The input component 1140 and/or the communication component 1160 may receive an indication that a handover is likely for a UE, wherein the UE is in communication with the application server to receive a data stream. The output component 1150 and/or the communication component 1160 may provide the data stream using values of one or more parameters to reduce an impact of a communication interruption associated with the handover.

The input component 1140 and/or the communication component 1160 may receive an indication that the handover is no longer likely for the UE.

The output component 1150 and/or the communication component 1160 may provide, after receiving the indication the handover is no longer likely for the UE, the data stream using additional values of the one or more parameters that are not configured to reduce the impact of the communication interruption associated with the handover.

The number and arrangement of components shown in FIG. 11 are provided as an example. Device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

Figure 12:
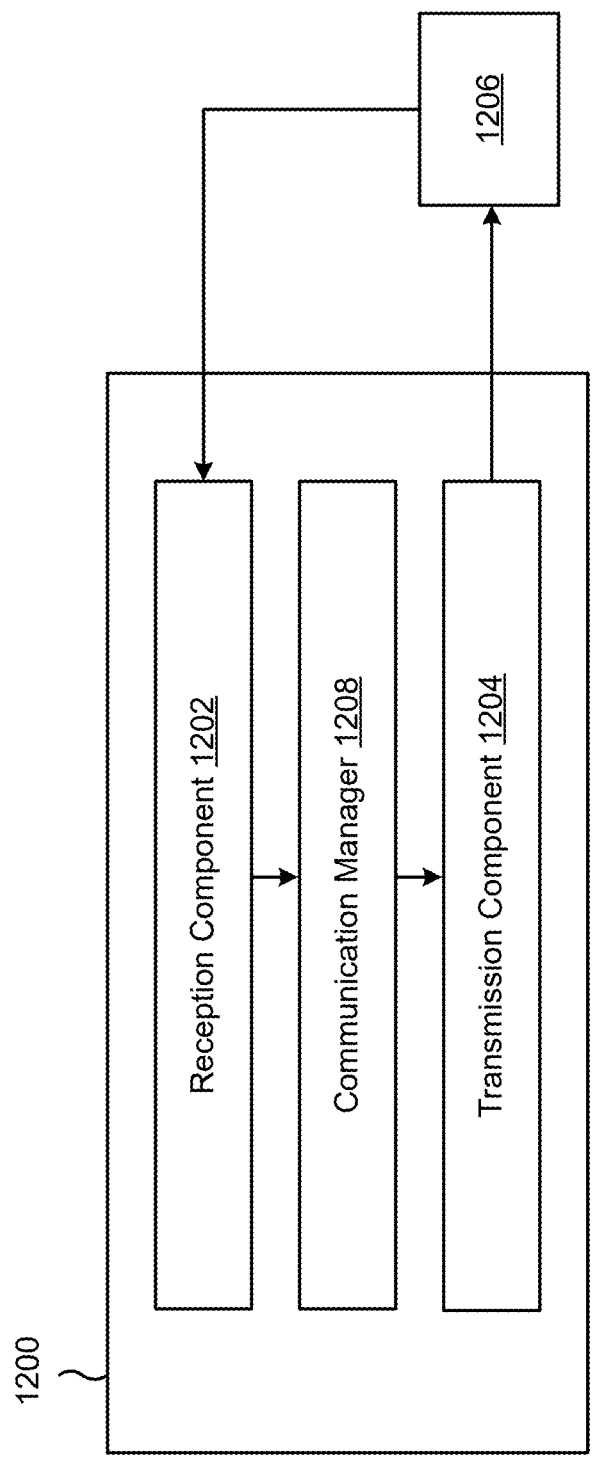

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208 (e.g., the communication manager 140).

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The transmission component 1204 may transmit, to an application server, an indication that a handover is likely for the UE, wherein the UE is in communication with the application server to receive a data stream. The reception component 1202 may receive the data stream having values of one or more parameters applied to reduce an impact of a communication interruption associated with the handover.

The transmission component 1204 may transmit an indication that the handover is no longer likely for the UE.

The reception component 1202 may receive, after transmitting the indication the handover is no longer likely for the UE, the data stream using additional values of the one or more parameters that are not configured to reduce the impact of the communication interruption associated with the handover.

The communication manager 1208 may detect that a handover is likely for the UE, wherein the UE is in communication with an application server to transmit a data stream. The transmission component 1204 may transmit the data stream having values of one or more parameters applied to reduce an impact of a communication interruption associated with the handover.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
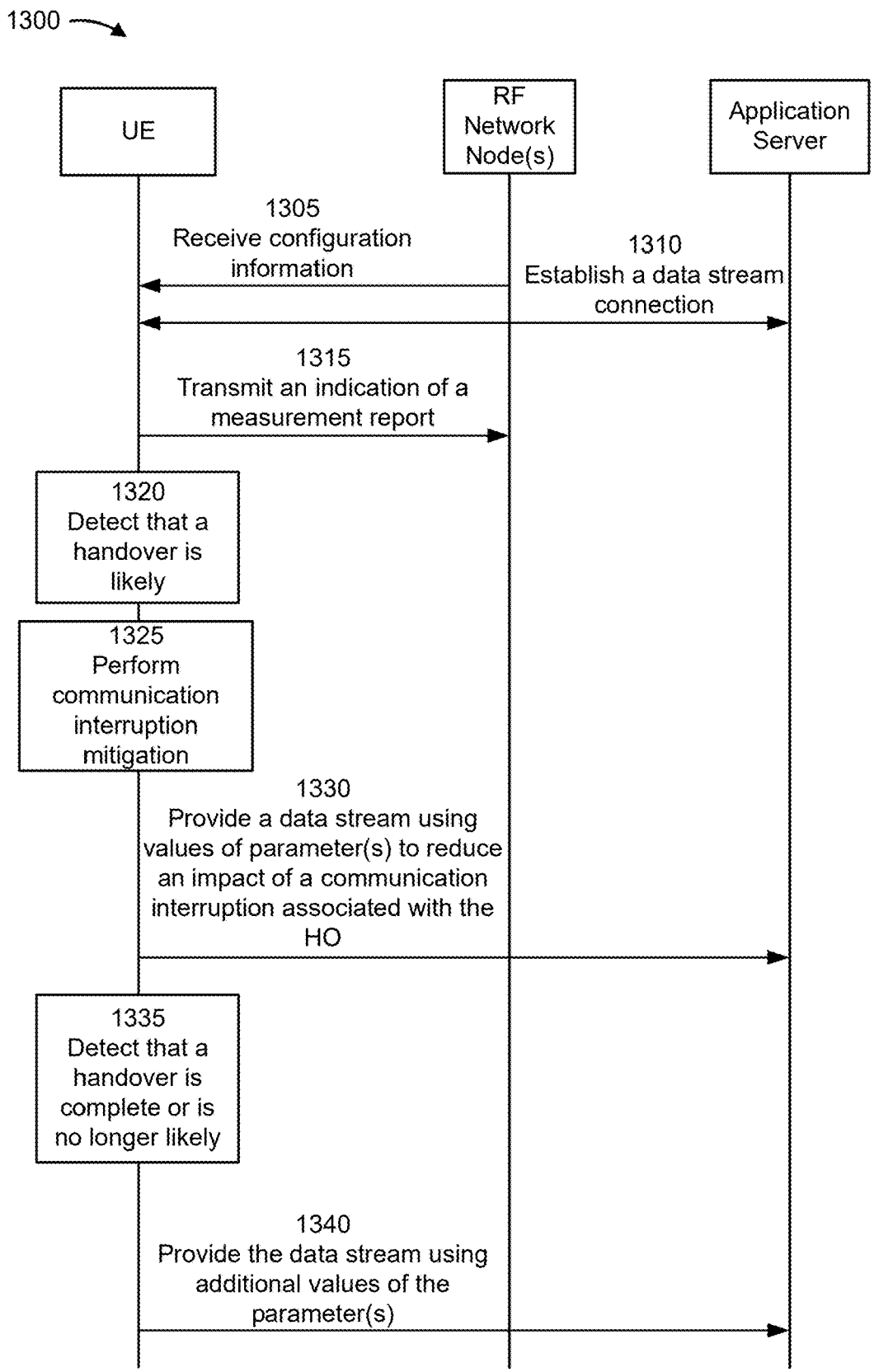
FIG. 13 is a diagram illustrating an example associated with handover indications for data stream application, in accordance with the present disclosure.

FIG. 13 is a diagram of an example 1300 associated with handover indications for data stream application, in accordance with the present disclosure. As shown in FIG. 13, one or more RF network nodes (e.g., base station 110) may communicate with a UE (e.g., UE 120). In some aspects, the one or more RF network nodes and the UE may be part of a wireless network (e.g., wireless network 100) that also includes, or is connected to, an application server. The UE and a first RF network node of the one or more RF network nodes may have established a wireless connection prior to operations shown in FIG. 13. The description of FIG. 13 is similar to the description of FIG. 6, where FIG. 6 depicts a downlink stream and an application server performing communication interruption mitigation, whereas FIG. 13 depicts an uplink stream and the UE performing communication interruption mitigation. In some aspects, a data stream application may include an XR application.

As shown by reference number 1305, the first network node may transmit, and the UE may receive, configuration information. In some aspects, the UE may receive the configuration information via one or more of RRC signaling, one or more MAC control elements (CEs), and/or downlink control information (DCI), among other examples. In some aspects, the configuration information may include an indication of one or more configuration parameters (e.g., already known to the UE and/or previously indicated by the first network node or another network device) for selection by the UE, and/or explicit configuration information for the UE to use to configure the UE, among other examples.

In some aspects, the configuration information may indicate that the UE is to detect and/or determine that a handover is likely. In some aspects, the configuration information may indicate that the UE is to detect and/or determine that a handover is likely based at least in part on generating and/or transmitting an indication of a measurement report. For example, the configuration information may indicate that the UE is to detect and/or determine that a handover is likely based at least in part on the measurement report indicating that a neighbor cell is associated with a measured signal strength that is greater than (e.g., by an amount that satisfies a threshold) a signal strength associated with a serving cell to which the UE is connected. In some aspects, the configuration information may indicate that the UE is to detect and/or determine that a handover is likely based at least in part on the neighbor cell having a configuration for improved spectral efficiency, increased bandwidth per UE, and/or other improvements in communication for the UE, among other examples.

In some aspects, the configuration information may include one or more information elements associated with the one or more connected application servers. In some aspects, the configuration information may indicate one or more conditions that indicate when a handover is likely. For example, the configuration information may configure one or more parameters for a conditional handover process.

The UE may configure itself based at least in part on the configuration information. In some aspects, the UE may be configured to perform one or more operations described herein based at least in part on the configuration information.

As shown by reference number 1310, the UE may establish a data stream connection (e.g., an data stream connection and/or a real-time video connection) with the application server. For example, the UE may establish the data stream connection via one or more application layer or user plane communications. In some aspects, establishing the data stream connection may include establishing and/or configuring an API for providing information associated with an expected handover to reduce an impact of a communication interruption associated with the handover. In some aspects, the data stream may include XR data and/or a real-time video communication, among other examples.

As shown by reference number 1315, the UE may transmit, and the first RF network node may receive, an indication of a measurement report. In some aspects, the measurement report may indicate one or more measurements (e.g., at the UE) of reference signals transmitted by the first RF network node (e.g., a source network node) and reference signals transmitted by a second RF network node (e.g., a target network node). For example, the measurement report may indicate that a signal strength associated with the second RF network node is stronger (e.g., by a threshold amount) than a signal strength associated with the first RF network node.

As shown by reference number 1320, the UE may detect that a handover is likely. In some aspects, the UE may detect that the handover is likely based at least in part on the measurement report. For example, the UE may detect that the handover is likely based at least in part on indicating, within the measurement report, that network conditions (e.g., measured signal strengths) for communicating with the second RF network node are better suited for the UE than conditions for communication with the first RF network node. In some aspects, the UE may detect and/or determine that a handover is likely based at least in part on the neighbor cell having a configuration for improved spectral efficiency, increased bandwidth per UE, and/or other improvements in communication for the UE, among other examples.

In some aspects, the UE may provide, to the application server, an indication that the handover is likely. For example, the UE may transmit, to the first RF network node, a message that is provided from the first RF network node to the application server (e.g., via an application layer communication). In some aspects, the UE may use an API associated with reporting handovers to provide the indication to the application server.

In some aspects, an entity and/or component of the UE (e.g., communication manager 140) may provide an indication to an application client on the UE to indicate that the handover is likely. In some aspects, the entity and/or component of the UE may provide the indication to a connected device (e.g., a headset or a display device, among other examples), among other examples.

As shown by reference number 1325, the UE may perform communication interruption mitigation. In some aspects, the UE may configure one or more parameters for providing data stream (e.g., an uplink stream) to the application server, where the one or more parameters are associated with a reduction of an impact of communication interruption associated with the handover. In some aspects, the application client on the UE may request that the entity and/or component of the UE (e.g., communication manager 140) configures the one or more parameters for providing the data stream to the application server (e.g., via the one or more RF network nodes) using the one or more parameters. The one or more parameters may include a frame type of a frame of the data stream provided to the application server, a de-jitter buffer depth of the data stream provided to the application server, a throttle rate of the data stream provided to the UE, a number of frames to skip during the communication interruption associated with the handover, and/or an FEC rate of the data provided to the application server.

In some aspects, the UE may provide the data stream with a frame type to reduce the impact of the communication interruption associated with the handover by transmitting an I-frame after completion of the handover independently from (e.g., in the absence of or without waiting for) reception of an indication of a packet loss from the application server. In some aspects, the UE may provide the data stream using a value of the de-jitter buffer depth to reduce the impact of the communication interruption associated with the handover by configuring the de-jitter buffer depth such that a target delay value is based at least in part on an expected handover interruption time. For example, the de-jitter buffer depth may be configured to match (e.g., to be the same as, to be a buffer amount greater than, or to be a buffer percentage greater than) an expected handover interruption time.

In some aspects, the UE may provide the data stream using a value of the throttle rate to reduce the impact of the communication interruption associated with the handover by reducing a video throughput, relative to a throughput used before transmission of the indication that the handover is likely, until completion of the handover. In some aspects, the UE may provide the data stream using a value of the FEC rate to reduce the impact of the communication interruption associated with the handover by increasing an FEC rate, relative to an FEC rate used before transmission of the indication that the handover is likely, until completion of the handover.

In some aspects, the application server may skip one or more frames based at least in part on receiving the indication that the handover is likely. For example, the application server may skip a number of frames that is based at least in part on an expected length of time of the communication interruption for the handover. By skipping the one or more frames, the application server may begin transmitting frames after the communication interruption with an increased likelihood of the frames being on time (e.g., received in time to be rendered by the UE). In some aspects, a first frame after the skipped one or more frames may be an I-frame.

In some aspects, the UE and the one or more RF network nodes may coordinate use of the one or more parameters to reduce an impact of a communication interruption associated with the handover.

As shown by reference number 1330, the UE may provide, and the application server may receive (e.g., via the first RF network node and/or via the second RF network node), the data stream using values of the one or more parameters to reduce the impact of the communication interruption associated with the handover.

As shown by reference number 1335, the UE may detect that the handover is complete or is no longer likely. For example, the UE may detect that the handover is complete based at least in part on transmitting an RRC reconfiguration complete message to the second RF network node. The UE may detect that the handover is no longer likely based at least in part on transmitting an additional measurement report that indicates that the UE would no longer benefit from the handover (e.g., a signal strength associated with the first RF node became stronger than the signal strength associated with the second RF node, or the handover was rejected by the second RF node, among other examples).

In some aspects, the UE may provide, and the application server may receive (e.g., via the second RF network node), an indication that the handover is complete or is no longer likely.

As shown by reference number 1340, the UE may provide, and the application server may receive, the data stream using one or more additional values of the one or more parameters. For example, the UE may provide the data stream using one or more values that were used before (e.g., prior to) detecting that the handover is likely for the UE. Additionally, or alternatively, the one or more additional values may not be configured to reduce the impact of the communication interruption associated with the handover. For example, the one or more values may be configured to improve image quality, conserve communication and/or network resources, and/or otherwise operate without attempting to reduce the impact of a communication interruption associated with a handover.

Based at least in part on the UE performing communication interruption mitigation by using the one or more values of the one or more parameters, the UE may reduce degradation of the XR stream (e.g., reduce packet errors and/or missed frames) and/or may conserve resources that may have otherwise been used to recover from missed frames during the handover.

As indicated above, FIG. 13 is provided as an example. Other examples may differ from what is described with regard to FIG. 13.

Figure 14:
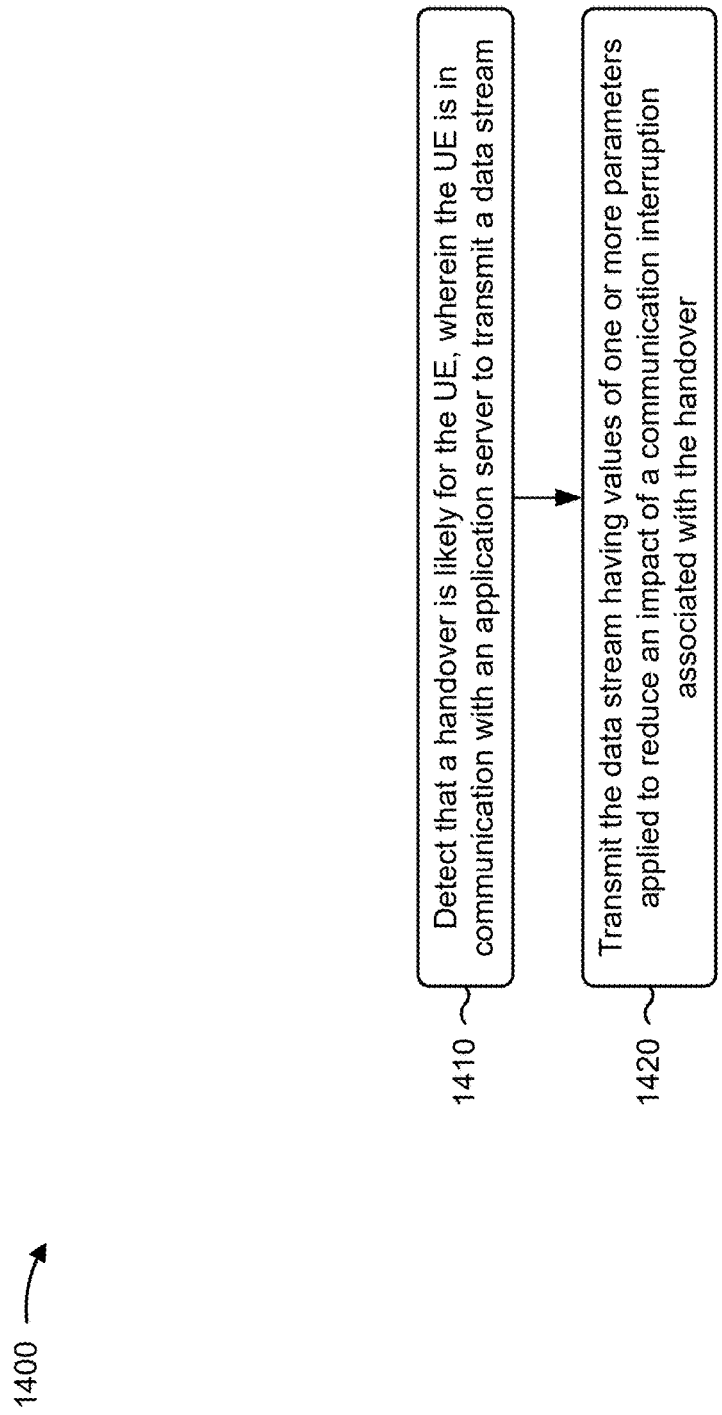
FIG. 14 is a diagram illustrating an example process associated with handover indications for data stream application, in accordance with the present disclosure.

FIG. 14 is a diagram illustrating an example process 1400 performed, for example, by a UE, in accordance with the present disclosure. Example process 1400 is an example where the UE (e.g., UE 120) performs operations associated with handover indication for XR application.

As shown in FIG. 14, in some aspects, process 1400 may include detecting that a handover is likely for the UE, wherein the UE is in communication with an application server to transmit a data stream (block 1410). For example, the UE (e.g., using communication manager 140 and/or communication manager 1208, depicted in FIG. 12) may detect that a handover is likely for the UE, wherein the UE is in communication with an application server to transmit a data stream, as described above.

As further shown in FIG. 14, in some aspects, process 1400 may include transmitting the data stream having values of one or more parameters applied to reduce an impact of a communication interruption associated with the handover (block 1420). For example, the UE (e.g., using communication manager 140 and/or transmission component 1204, depicted in FIG. 12) may transmit the data stream having values of one or more parameters applied to reduce an impact of a communication interruption associated with the handover, as described above.

Process 1400 may include additional aspects, such as any single aspect or any combination of aspects described below and/or in connection with one or more other processes described elsewhere herein.

In a first aspect, the one or more parameters comprise one or more of a frame type of a frame of the data stream provided based at least in part on the handover, a de-jitter buffer depth of the data stream provided based at least in part on the handover, a throttle rate of the data stream provided based at least in part on the handover, a number of frames to skip during the communication interruption associated with the handover, or an FEC rate.

In a second aspect, alone or in combination with the first aspect, receiving the data stream using a value of the frame type of the frame of the data stream to reduce the impact of the communication interruption associated with the handover comprises receiving an I-frame after completion of the handover independently from receiving an indication of a packet loss from the UE.

In a third aspect, alone or in combination with one or more of the first and second aspects, the I-frame is a frame of the data stream that does not rely on a previous or subsequent frame for decoding.

In a fourth aspect, alone or in combination with one or more of the first through third aspects, receiving the data stream using a value of the de-jitter buffer depth to reduce the impact of the communication interruption associated with the handover comprises receiving the data stream having the de-jitter buffer depth applied such that a target delay value is based at least in part on an expected handover interruption time.

In a fifth aspect, alone or in combination with one or more of the first through fourth aspects, receiving the data stream using a value of the throttle rate to reduce the impact of the communication interruption associated with the handover comprises receiving the data stream having a reduced video throughput, relative to a video throughput used before transmission of the indication that the handover is likely, until completion of the handover.

In a sixth aspect, alone or in combination with one or more of the first through fifth aspects, receiving the data stream using a value of the FEC rate to reduce the impact of the communication interruption associated with the handover comprises receiving the data stream having an increased FEC rate, relative to an FEC rate used before transmission of the indication that the handover is likely, until completion of the handover.

In a seventh aspect, alone or in combination with one or more of the first through sixth aspects, transmitting the indication that the handover is likely for the UE comprises one or more of transmitting the indication based at least in part on a measurement report indicating that an active cell associated with the UE is associated with a first signal strength that is weaker than a second signal strength associated with a neighbor cell associated with the UE, or transmitting the indication that the handover is likely for the UE before a handover operation begins.

In an eighth aspect, alone or in combination with one or more of the first through seventh aspects, process 1400 includes transmitting an indication that the handover is no longer likely for the UE, and receiving, after transmitting the indication the handover is no longer likely for the UE, the data stream using additional values of the one or more parameters that are not configured to reduce the impact of the communication interruption associated with the handover.

In a ninth aspect, alone or in combination with one or more of the first through eighth aspects, the additional values of the one or more parameters comprises values of the one or more parameters used before transmission of the indication that the handover is likely for the UE.

In a tenth aspect, alone or in combination with one or more of the first through ninth aspects, the data stream comprises one or more of XR data, or a real-time video communication.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
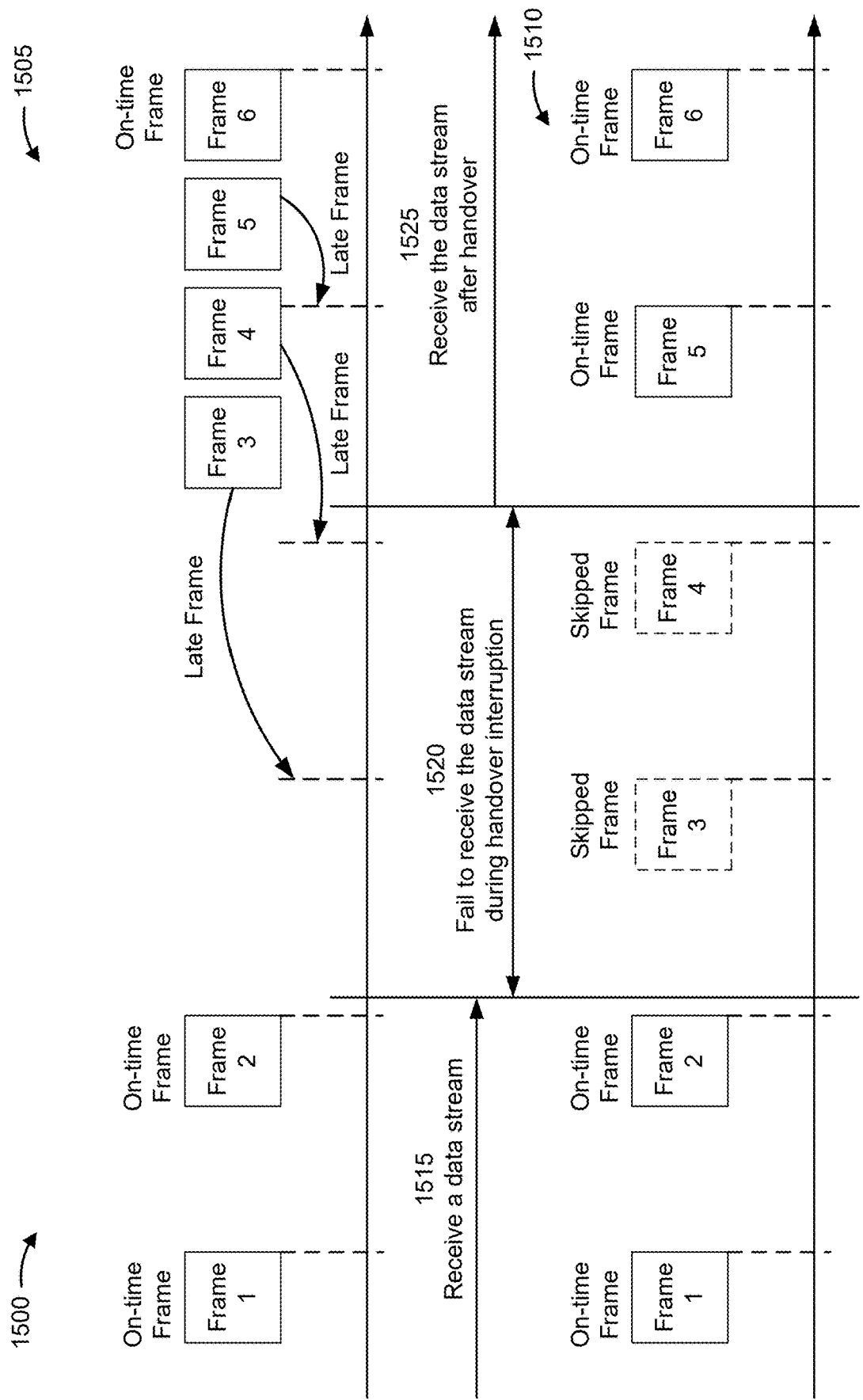
FIGS. 15-16 are diagrams illustrating examples associated with handover indications for data stream application, in accordance with the present disclosure.

FIG. 15 is a diagram of an example 1500 associated with handover indications for data stream application, in accordance with the present disclosure. As shown in FIG. 15, an application server may communicate with a UE (e.g., UE 120). The UE and the application server may have established a connection prior to operations shown in FIG. 15 (e.g., via a user plane and/or application layer communications). In some aspects, a data stream application may include an XR application.

As shown in FIG. 15, and by example configurations 1505 and 1510, the application server may be configured to provide 6 frames of a data stream (e.g., XR data and/or a real-time video communication) to the UE. As shown by example configuration 1505, the application server may be configured without frame skipping, or with a number of frames to skip during a communication interruption associated with a handover set to zero. As shown by example configuration 1510, the application server may be configured with a number of frames to skip during a communication interruption associated with a handover, with the number set to two.

As shown by reference number 1515, the UE may receive a data stream before a handover interruption. In some aspects, the UE may transmit an indication that a handover is likely, while the connection is not yet interrupted.

As shown by reference number 1520, the UE may fail to receive the data stream during handover interruption. As shown in example configuration 1505, the application server may delay transmissions of frames until after the handover interruption. As shown by example configuration 1510, the application server may skip frames that were originally scheduled during the handover interruption. Skipping frames may include transmitting a blank frame, dropping contents of the frames, and/or otherwise discarding contents of the skipped frames without delaying the skipped frames for later transmission.

As shown by reference number 1525, the UE may receive the data stream after the handover is completed. As shown by example configuration 1505, the application server may transmit frames that were not received during the handover interruption. However, one or more of the frames may be late frames that are received by the UE after a deadline for rendering the one or more frames. In this way, the one or more frames consume network, power, communication, and/or processing resources to communicate via a wireless network even though the frames are too late to be rendered at the UE. Additionally, or alternatively, one or more additional frames (e.g., frame 5) may be delayed to allow for late transmission of the one or more frames.

As shown by example configuration 1510, the application server may refrain from transmitting frames that were skipped and/or not received during the handover interruption. In this way, the application server and the wireless network may conserve network, power, communication, and/or processing resources that may have otherwise been used to communicate the one or more skipped frames. Additionally, or alternatively, one or more additional frames (e.g., frame 5) may be transmitted on time after the one or more skipped frames.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
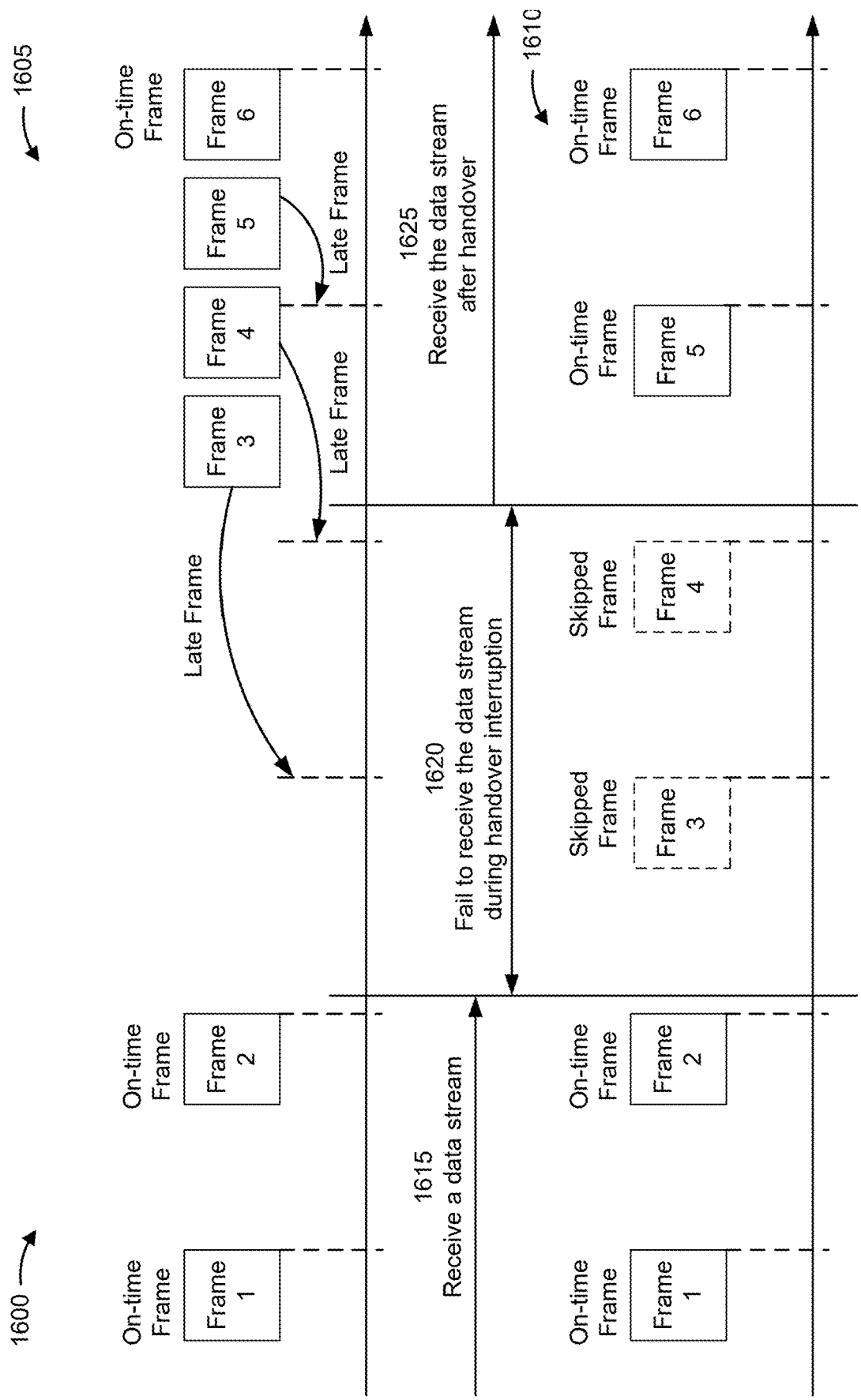

FIG. 16 is a diagram of an example 1600 associated with handover indications for data stream application, in accordance with the present disclosure. As shown in FIG. 16, an application server may communicate with a UE (e.g., UE 120). The UE and the application server may have established a connection prior to operations shown in FIG. 16 (e.g., via a user plane and/or application layer communications). In some aspects, a data stream application may include an XR application.

As shown in FIG. 16, and by example configurations 1605 and 1610, the UE may be configured to provide 6 frames of a data stream (e.g., XR data and/or a real-time video communication) to the application server. As shown by example configuration 1605, the UE may be configured without frame skipping, or with a number of frames to skip during a communication interruption associated with a handover set to zero. As shown by example configuration 1610, the UE may be configured with a number of frames to skip during a communication interruption associated with a handover, with the number set to two.

As shown by reference number 1615, the UE may transmit a data stream before a handover interruption. In some aspects, the UE may transmit, while the connection is not yet interrupted, an indication that a handover is likely.

As shown by reference number 1620, the application server may fail to receive the data stream during handover interruption. As shown in example configuration 1605, the UE may delay transmissions of frames until after the handover interruption. As shown by example configuration 1610, the UE may skip frames that were originally scheduled during the handover interruption. Skipping frames may include transmitting a blank frame, dropping contents of the frames, and/or otherwise discarding contents of the skipped frames without delaying the skipped frames for later transmission.

As shown by reference number 1625, the UE may transmit the data stream after the handover is completed. As shown by example configuration 1605, the UE may transmit frames that were not received during the handover interruption. However, one or more of the frames may be late frames that are received by the application server after a deadline for generating new downlink frames associated with the late frames. In this way, the one or more frames consume network, power, communication, and/or processing resources to communicate via a wireless network even though the frames are too late to be used by the application server. Additionally, or alternatively one or more additional frames (e.g., frame 5) may be delayed to allow for late transmission of the one or more frames.

As shown by example configuration 1610, the UE may refrain from transmitting frames that were skipped and/or not received during the handover interruption. In this way, the UE and the wireless network may conserve network, power, communication, and/or processing resources that may have otherwise been used to communicate the one or more skipped frames. Additionally, or alternatively, one or more additional frames (e.g., frame 5) may be transmitted on time after the one or more skipped frames.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The following provides an overview of some Aspects of the present disclosure:

Aspect 1: A method of wireless communication performed by an application server, comprising: receiving an indication that a handover is likely for a user equipment (UE), wherein the UE is in communication with the application server to receive a data stream; and providing the data stream using values of one or more parameters to reduce an impact of a communication interruption associated with the handover.

Aspect 2: The method of Aspect 1, wherein the one or more parameters comprise one or more of: a frame type of a frame of the data stream provided based at least in part on the handover, a de-jitter buffer depth of the data stream provided based at least in part on the handover, a throttle rate of the data stream provided based at least in part on the handover, a number of frames to skip during the communication interruption associated with the handover, or a forward error correction (FEC) rate.

Aspect 3: The method of Aspect 2, wherein providing the data stream using a value of the frame type of the frame of the data stream to reduce the impact of the communication interruption associated with the handover comprises: transmitting an I-frame after completion of the handover independently from receiving an indication of a packet loss from the UE.

Aspect 4: The method of Aspect 3, wherein the I-frame is a frame of the data stream that does not rely on a previous or subsequent frame for decoding.

Aspect 5: The method of any of Aspects 2-4, wherein providing the data stream using a value of the de-jitter buffer depth to reduce the impact of the communication interruption associated with the handover comprises: configuring the de-jitter buffer depth such that a target delay value is based at least in part on an expected handover interruption time.

Aspect 6: The method of any of Aspects 2-5, wherein providing the data stream using a value of the throttle rate to reduce the impact of the communication interruption associated with the handover comprises: reducing a video throughput, relative to a throughput used before transmission of the indication that the handover is likely, until completion of the handover.

Aspect 7: The method of any of Aspects 2-6, wherein providing the data stream using a value of the FEC rate to reduce the impact of the communication interruption associated with the handover comprises: increasing an FEC rate, relative to an FEC rate used before transmission of the indication that the handover is likely, until completion of the handover.

Aspect 8: The method of any of Aspects 1-7, wherein receiving the indication that the handover is likely for the UE comprises one or more of: receiving the indication based at least in part on a measurement report indicating that an active cell associated with the UE is associated with a first signal strength that is weaker than a second signal strength associated with a neighbor cell associated with the UE, or receiving the indication that the handover is likely for the UE before a handover operation begins.

Aspect 9: The method of any of Aspects 1-8, further comprising: receiving an indication that the handover is no longer likely for the UE; and providing, after receiving the indication the handover is no longer likely for the UE, the data stream using additional values of the one or more parameters that are not configured to reduce the impact of the communication interruption associated with the handover.

Aspect 10: The method of Aspect 9, wherein the additional values of the one or more parameters comprises values of the one or more parameters used before receiving the indication that the handover is likely for the UE.

Aspect 12, The method of any of Aspects 1-10, wherein the data stream comprises one or more of: XR data, or a real-time video communication.

Aspect 12: A method of wireless communication performed by a user equipment (UE), comprising: transmitting, to an application server, an indication that a handover is likely for the UE, wherein the UE is in communication with the application server to receive a data stream; and receiving the data stream having values of one or more parameters applied to reduce an impact of a communication interruption associated with the handover.

Aspect 13: The method of Aspect 12, wherein the one or more parameters comprise one or more of: a frame type of a frame of the data stream provided based at least in part on the handover, a de-jitter buffer depth of the data stream provided based at least in part on the handover, a throttle rate of the data stream provided based at least in part on the handover, a number of frames to skip during the communication interruption associated with the handover, or a forward error correction (FEC) rate.

Aspect 14: The method of Aspect 13, wherein receiving the data stream using a value of the frame type of the frame of the data stream to reduce the impact of the communication interruption associated with the handover comprises: receiving an I-frame after completion of the handover independently from receiving an indication of a packet loss from the UE.

Aspect 15: The method of Aspect 14, wherein the I-frame is a frame of the data stream that does not rely on a previous or subsequent frame for decoding.

Aspect 16: The method of any of Aspects 13-15, wherein receiving the data stream using a value of the de-jitter buffer depth to reduce the impact of the communication interruption associated with the handover comprises: receiving the data stream having the de-jitter buffer depth applied such that a target delay value is based at least in part on an expected handover interruption time.

Aspect 17: The method of any of Aspects 13-16, wherein receiving the data stream using a value of the throttle rate to reduce the impact of the communication interruption associated with the handover comprises: receiving the data stream having a reduced video throughput, relative to a video throughput used before transmission of the indication that the handover is likely, until completion of the handover.

Aspect 18: The method of any of Aspects 13-17, wherein receiving the data stream using a value of the FEC rate to reduce the impact of the communication interruption associated with the handover comprises: receiving the data stream having an increased FEC rate, relative to an FEC rate used before transmission of the indication that the handover is likely, until completion of the handover.

Aspect 19: The method of any of Aspects 12-18, wherein transmitting the indication that the handover is likely for the UE comprises one or more of: transmitting the indication based at least in part on a measurement report indicating that an active cell associated with the UE is associated with a first signal strength that is weaker than a second signal strength associated with a neighbor cell associated with the UE, or transmitting the indication that the handover is likely for the UE before a handover operation begins.

Aspect 20: The method of any of Aspects 12-19, further comprising: transmitting an indication that the handover is no longer likely for the UE; and receiving, after transmitting the indication the handover is no longer likely for the UE, the data stream using additional values of the one or more parameters that are not configured to reduce the impact of the communication interruption associated with the handover.

Aspect 21: The method of Aspect 20, wherein the additional values of the one or more parameters comprises values of the one or more parameters used before transmission of the indication that the handover is likely for the UE.

Aspect 22: The method of any of Aspects 12-21, wherein the data stream comprises one or more of: XR data, or a real-time video communication.

Aspect 23: A method of wireless communication performed by a user equipment (UE), comprising: detecting that a handover is likely for the UE, wherein the UE is in communication with an application server to transmit a data stream; and transmitting the data stream having values of one or more parameters applied to reduce an impact of a communication interruption associated with the handover.

Aspect 24: The method of Aspect 23, wherein the one or more parameters comprise one or more of: a frame type of a frame of the data stream provided based at least in part on the handover, a de-jitter buffer depth of the data stream provided based at least in part on the handover, a throttle rate of the data stream provided based at least in part on the handover, a number of frames to skip during the communication interruption associated with the handover, or a forward error correction (FEC) rate.

Aspect 25: The method of Aspect 24, wherein receiving the data stream using a value of the frame type of the frame of the data stream to reduce the impact of the communication interruption associated with the handover comprises: receiving an I-frame after completion of the handover independently from receiving an indication of a packet loss from the UE.

Aspect 26: The method of Aspect 25, wherein the I-frame is a frame of the data stream that does not rely on a previous or subsequent frame for decoding.

Aspect 27: The method of any of Aspects 24-26, wherein receiving the data stream using a value of the de-jitter buffer depth to reduce the impact of the communication interruption associated with the handover comprises: receiving the data stream having the de-jitter buffer depth applied such that a target delay value is based at least in part on an expected handover interruption time.

Aspect 28: The method of any of Aspects 24-27, wherein receiving the data stream using a value of the throttle rate to reduce the impact of the communication interruption associated with the handover comprises: receiving the data stream having a reduced video throughput, relative to a video throughput used before transmission of the indication that the handover is likely, until completion of the handover.

Aspect 29: The method of any of Aspects 24-28, wherein receiving the data stream using a value of the FEC rate to reduce the impact of the communication interruption associated with the handover comprises: receiving the data stream having an increased FEC rate, relative to an FEC rate used before transmission of the indication that the handover is likely, until completion of the handover.

Aspect 30: The method of any of Aspects 23-29, wherein transmitting the indication that the handover is likely for the UE comprises one or more of: transmitting the indication based at least in part on a measurement report indicating that an active cell associated with the UE is associated with a first signal strength that is weaker than a second signal strength associated with a neighbor cell associated with the UE, or transmitting the indication that the handover is likely for the UE before a handover operation begins.

Aspect 31: The method of any of Aspects 23-30, further comprising: transmitting an indication that the handover is no longer likely for the UE; and receiving, after transmitting the indication the handover is no longer likely for the UE, the data stream using additional values of the one or more parameters that are not configured to reduce the impact of the communication interruption associated with the handover.

Aspect 32: The method of Aspect 31, wherein the additional values of the one or more parameters comprises values of the one or more parameters used before transmission of the indication that the handover is likely for the UE.

Aspect 33: The method of any of Aspects 23-32, wherein the data stream comprises one or more of: extended reality (XR) data, or a real-time video communication.

Aspect 34: An apparatus for wireless communication at a device, comprising a processor; memory coupled with the processor; and instructions stored in the memory and executable by the processor to cause the apparatus to perform the method of one or more of Aspects 1-33.

Aspect 35: A device for wireless communication, comprising a memory and one or more processors coupled to the memory, the one or more processors configured to perform the method of one or more of Aspects 1-33.

Aspect 36: An apparatus for wireless communication, comprising at least one means for performing the method of one or more of Aspects 1-33.

Aspect 37: A non-transitory computer-readable medium storing code for wireless communication, the code comprising instructions executable by a processor to perform the method of one or more of Aspects 1-33.

Aspect 38: A non-transitory computer-readable medium storing a set of instructions for wireless communication, the set of instructions comprising one or more instructions that, when executed by one or more processors of a device, cause the device to perform the method of one or more of Aspects 1-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 one or more memories; and
 one or more processors, coupled to the one or more memories, configured to:
  transmit, to an application server, an indication that a handover is likely for the UE, wherein the UE is in communication with the application server to receive a data stream;
  receive the data stream having a set of values of one or more parameters configured to reduce an impact of a communication interruption associated with the handover, wherein at least one value of the set of values is configured based at least in part on an expected handover interruption time;
  transmit, after receiving the data stream having the set of values of the one or more parameters configured to reduce the impact of the communication interruption, an indication that the handover is no longer likely for the UE; and
  receive, after transmitting the indication the handover is no longer likely for the UE, the data stream using additional values of the one or more parameters that are not configured to reduce the impact of the communication interruption.

2. The UE of claim 1, wherein the one or more parameters comprise one or more of:
 a frame type of a frame of the data stream provided based at least in part on the handover,
 a de-jitter buffer depth of the data stream provided based at least in part on the handover,
 a throttle rate of the data stream provided based at least in part on the handover,
 a number of frames to skip during the communication interruption, or
 a forward error correction (FEC) rate.

3. The UE of claim 2, wherein the one or more parameters comprise the frame type, wherein the set of values include a value of the frame type, and wherein the one or more processors, to receive the data stream, are configured to:
 receive an I-frame after completion of the handover independently from receiving an indication of a packet loss from the UE.

4. The UE of claim 3, wherein the I-frame is a frame of the data stream that does not rely on a previous or subsequent frame for decoding.

5. The UE of claim 2, wherein the one or more parameters comprise the de-jitter buffer depth, wherein the set of values include a value of the de-jitter buffer depth, and wherein a target delay value corresponding to the value of the de-jitter buffer depth is based at least in part on the expected handover interruption time.

6. The UE of claim 2, wherein the one or more parameters comprise the throttle rate, wherein the set of values include a value of the throttle rate, and wherein the one or more processors, to receive the data stream, are configured to:
 receive the data stream having a reduced video throughput, relative to a video throughput used before transmission of the indication that the handover is likely, until completion of the handover.

7. The UE of claim 2, wherein the one or more parameters comprise the FEC rate, wherein the set of values include a value of the FEC rate, and wherein the one or more processors, to receive the data stream, are configured to:
 receive the data stream having an increased FEC rate, relative to an FEC rate used before transmission of the indication that the handover is likely, until completion of the handover.

8. The UE of claim 1, wherein the one or more processors, to transmit the indication that the handover is likely for the UE, are configured to:
  transmit the indication based at least in part on a measurement report indicating that an active cell associated with the UE is associated with a first signal strength that is weaker than a second signal strength associated with a neighbor cell associated with the UE, or
  transmit the indication that the handover is likely for the UE before a handover operation begins.

9. The UE of claim 1, wherein the additional values of the one or more parameters comprises values of the one or more parameters used before transmission of the indication that the handover is likely for the UE.

10. The UE of claim 1, wherein the data stream comprises one or more of:
  extended reality (XR) data, or
  a real-time video communication.

11. An application server for wireless communication, comprising:
  one or more memories; and
  one or more processors, coupled to the one or more memories, configured to:
    receive an indication, that a handover is likely for a user equipment (UE), wherein the UE is in communication with the application server to receive a data stream;
    provide the data stream using a set of values of one or more parameters to reduce an impact of a communication interruption associated with the handover, wherein at least one value of the set of values is configured based at least in part on an expected handover interruption time;
    receive, after providing the data stream using the set of values of the one or more parameters to reduce the impact of the communication interruption, an indication that the handover is no longer likely for the UE; and
    provide, after receiving the indication the handover is no longer likely for the UE, the data stream using additional values of the one or more parameters that are not configured to reduce the impact of the communication interruption.

12. The application server of claim 11, wherein the one or more parameters comprise one or more of:
  a frame type of a frame of the data stream provided based at least in part on the handover,
  a de-jitter buffer depth of the data stream provided based at least in part on the handover,
  a throttle rate of the data stream provided based at least in part on the handover,
  a number of frames to skip during the communication interruption, or
  a forward error correction (FEC) rate.

13. The application server of claim 12, wherein the one or more parameters comprise the frame type, wherein the set of values include a value of the frame type, and wherein the one or more processors, to provide the data stream using the value of the frame type, are configured to:
  transmit an I-frame after completion of the handover independently from receiving an indication of a packet loss from the UE.

14. The application server of claim 13, wherein the I-frame is a frame of the data stream that does not rely on a previous or subsequent frame for decoding.

15. The application server of claim 12, wherein the one or more parameters comprise the de-jitter buffer depth, wherein the set of values include a value of the de-jitter buffer depth, and wherein a target delay value corresponding to the value of the de-jitter buffer depth is based at least in part on the expected handover interruption time.

16. The application server of claim 12, wherein the one or more parameters comprise the throttle rate, wherein the set of values include a value of the throttle rate, and wherein the one or more processors, to provide the data stream using the value of the throttle rate, are configured to:
  reduce a video throughput, relative to a throughput used before transmission of the indication that the handover is likely, until completion of the handover.

17. The application server of claim 12, wherein the one or more parameters comprise the FEC rate, wherein the set of values include a value of the FEC rate, and wherein the one or more processors, to provide the data stream using the value of the FEC rate, are configured to:
  increase an FEC rate, relative to an FEC rate used before transmission of the indication that the handover is likely, until completion of the handover.

18. The application server of claim 11, wherein the one or more processors, to receive the indication that the handover is likely for the UE, are configured to:
  receive the indication based at least in part on a measurement report indicating that an active cell associated with the UE is associated with a first signal strength that is weaker than a second signal strength associated with a neighbor cell associated with the UE, or
  receive the indication that the handover is likely for the UE before a handover operation begins.

19. The application server of claim 11, wherein the additional values of the one or more parameters comprises values of the one or more parameters used before receiving the indication that the handover is likely for the UE.

20. The application server of claim 11, wherein the data stream comprises one or more of:
  extended reality (XR) data, or
  a real-time video communication.

21. A method of wireless communication performed by an application server, comprising:
  receiving an indication that a handover is likely for a user equipment (UE), wherein the UE is in communication with the application server to receive a data stream;
  providing the data stream using a set of values of one or more parameters to reduce an impact of a communication interruption associated with the handover, wherein at least one value of the set of values is configured based at least in part on an expected handover interruption time;
  receiving, after providing the data stream using the set of values of the one or more parameters to reduce the impact of the communication interruption, an indication that the handover is no longer likely for the UE; and
  providing, after receiving the indication the handover is no longer likely for the UE, the data stream using additional values of the one or more parameters that are not configured to reduce the impact of the communication interruption.

22. The method of claim 21, wherein the one or more parameters comprise one or more of:
  a frame type of a frame of the data stream provided based at least in part on the handover,
  a de-jitter buffer depth of the data stream provided based at least in part on the handover,
  a throttle rate of the data stream provided based at least in a number of frames to skip during the communication interruption, or a forward error correction (FEC) rate.

23. The method of claim 22, wherein the one or more parameters comprise the frame type, wherein the set of values include a value of the frame type, and wherein providing the data stream using the value of the frame type comprises:

transmitting an I-frame after completion of the handover independently from receiving an indication of a packet loss from the UE.

24. The method of claim 22, wherein the one or more parameters comprise the de-jitter buffer depth, wherein the set of values include a value of the de-jitter buffer depth, and wherein a target delay value corresponding to the value of the de-jitter buffer depth is based at least in part on the expected handover interruption time.

25. The method of claim 21, wherein the indication that the handover is likely for the UE is received via an application programming interface associated with reporting handovers.

26. A method of wireless communication performed by a user equipment (UE), comprising:

transmitting, to an application server, an indication that a handover is likely for the UE, wherein the UE is in communication with the application server to receive a data stream;

receiving the data stream having a set of values of one or more parameters configured to reduce an impact of a communication interruption associated with the handover, wherein at least one value of the set of values is configured based at least in part on an expected handover interruption time;

transmitting, after receiving the data stream having the set of values of the one or more parameters configured to reduce the impact of the communication interruption, an indication that the handover is no longer likely for the UE; and receive, after transmitting the indication the handover is no longer likely for the UE, the data stream using additional values of the one or more parameters that are not configured to reduce the impact of the communication interruption.

27. The method of claim 26, wherein the one or more parameters comprise one or more of:

a frame type of a frame of the data stream provided based at least in part on the handover, a de-jitter buffer depth of the data stream provided based at least in part on the handover, a throttle rate of the data stream provided based at least in part on the handover, a number of frames skipped during the communication interruption, or a forward error correction (FEC) rate.

28. The method of claim 27, wherein the one or more parameters comprise the frame type, wherein the set of values include a value of the frame type, and wherein receiving the data stream comprises:

receiving an I-frame after completion of the handover independently from receiving an indication of a packet loss from the UE.

29. The method of claim 27, wherein the one or more parameters comprise the de-jitter buffer depth, wherein the set of values include a value of the de-jitter buffer depth, and wherein a target delay value corresponding to the value of the de-jitter buffer depth is based at least in part on the expected handover interruption time.

30. The method of claim 27, wherein the indication that the handover is likely for the UE is transmitted using an application layer communication.

\* \* \* \* \*